(12) United States Patent
Moon et al.

(10) Patent No.: US 9,708,114 B2
(45) Date of Patent: Jul. 18, 2017

(54) VACUUM CONTAINER, TWIST AND LOCK CAP, BOTTLE LOCKER, FLUID COLLECTOR AND AUTO PUMP

(71) Applicant: NuWave, LLC, Libertyville, IL (US)

(72) Inventors: Jung S. Moon, Long Grove, IL (US); Eunjung Huh, Gurnee, IL (US); Mikale K. Kwon, Hoffman Estates, IL (US)

(73) Assignee: NuWave, LLC, Libertyville, IL (US)

( * ) Notice: Subject to any disclaimer, the term of this patent is extended or adjusted under 35 U.S.C. 154(b) by 393 days.

(21) Appl. No.: 14/207,436

(22) Filed: Mar. 12, 2014

(65) Prior Publication Data
US 2014/0190864 A1  Jul. 10, 2014

Related U.S. Application Data

(63) Continuation-in-part of application No. PCT/US2013/030607, filed on Mar. 12, 2013, which
(Continued)

(51) Int. Cl.
*B65D 81/20* (2006.01)
*B65D 81/34* (2006.01)
*A47J 47/10* (2006.01)

(52) U.S. Cl.
CPC .............. *B65D 81/34* (2013.01); *A47J 47/10* (2013.01); *B65D 81/2015* (2013.01);
(Continued)

(58) Field of Classification Search
CPC ............ B65D 81/2038; B65D 81/2007; B65D 81/2015; B65D 81/2023; B65D 81/34
(Continued)

(56) References Cited

U.S. PATENT DOCUMENTS

| 4,051,971 A | 10/1977 | Saleri et al. |
|---|---|---|
| 4,106,597 A | 8/1978 | Shook et al. |

(Continued)

FOREIGN PATENT DOCUMENTS

| CN | 101767686 A | 7/2010 |
|---|---|---|
| CN | 201545338 U | 8/2010 |
| WO | WO 0071433 A1 | 11/2000 |

OTHER PUBLICATIONS

Salad Chef. Amazingtvproducts. YouTube. Mar. 17, 2010. [Retrieved on Nov. 25, 2013]. Retrieved from the Internet: /www.youtube.com/watchtv=VZh7Jn9FM00>. entire video.
(Continued)

*Primary Examiner* — Reginald L Alexander
(74) *Attorney, Agent, or Firm* — Bishop Diehl & Lee, Ltd.

(57) ABSTRACT

A vacuum container and/or pump system may include a rounded rectangular base container with opening at a top to receive foodstuffs, adapted with an edge; an optional cover having at least two locking latches adapted to couple to the edge, the cover to close the opening of the container, the cover including: a circular vacuum tubular opening forming a cylindrical hole through the cover, and a cross-shaped notch on the inner cross-section of the tube, through which at least a portion of a plug is received and disposed when evacuating air, and optionally the cover may include a spinner, chopper, and/or twist/lock cap (coupling plug to container) to prevent loss of vacuum of the container (when cap has been twisted in locked position). A vacuum bag may include an opening; resealable fastener; hole for evacuating air with pump; cap for covering hole; and removable clip for easing closure.

19 Claims, 33 Drawing Sheets

Related U.S. Application Data is a continuation-in-part of application No. 13/551,607, filed on Jul. 17, 2012, now abandoned.

(60) Provisional application No. 61/609,453, filed on Mar. 12, 2012.

(52) U.S. Cl.
CPC ..... *B65D 81/2023* (2013.01); *B65D 81/2038* (2013.01); *B65D 81/2007* (2013.01)

(58) Field of Classification Search
USPC ........................................ 99/472; 141/10, 65
See application file for complete search history.

(56) References Cited

U.S. PATENT DOCUMENTS

| | | | |
|---|---|---|---|
| 4,186,786 A | | 2/1980 | Kirkpatrick |
| 4,285,105 A | | 8/1981 | Kirkpatrick |
| 4,362,095 A | | 12/1982 | Wheatley |
| 4,989,745 A | | 2/1991 | Schneider |
| 5,046,659 A | | 9/1991 | Warburton |
| 5,140,796 A | | 8/1992 | Pope |
| 5,407,277 A | | 4/1995 | Burke et al. |
| 5,449,079 A | | 9/1995 | Yang |
| 5,485,921 A | | 1/1996 | Tolendano |
| 5,535,900 A | * | 7/1996 | Huang ................. B65B 31/047 137/522 |
| 5,564,480 A | | 10/1996 | Chen |
| 5,783,012 A | | 7/1998 | Dais et al. |
| 5,836,056 A | | 11/1998 | Dais |
| 6,135,277 A | | 10/2000 | Armstrong |
| 6,135,636 A | | 10/2000 | Randall |
| 6,286,999 B1 | | 9/2001 | Cappel et al. |
| 6,343,546 B2 | * | 2/2002 | Ancona ..................... 210/360.1 |
| 6,510,946 B2 | | 1/2003 | Gutierrez et al. |
| 6,557,462 B1 | | 5/2003 | Wang |
| 6,571,430 B1 | | 6/2003 | Savicki et al. |
| 6,581,249 B1 | | 6/2003 | Savicki et al. |
| 6,594,872 B2 | | 7/2003 | Cisek |
| 6,925,688 B1 | | 8/2005 | Savicki |
| 6,994,227 B2 | | 2/2006 | Kwon |
| 7,036,988 B2 | | 5/2006 | Olechowski |
| 7,255,477 B2 | | 8/2007 | Arnell |
| 7,264,189 B2 | | 9/2007 | Holcomb et al. |
| 7,490,730 B2 | | 2/2009 | Cerone et al. |
| 7,611,284 B2 | | 11/2009 | Borchardt et al. |
| 7,713,320 B2 | | 5/2010 | Pham |
| 7,784,160 B2 | | 8/2010 | Ackerman et al. |
| 7,886,412 B2 | | 2/2011 | Ackerman et al. |
| 7,975,948 B2 | | 7/2011 | Holcomb et al. |
| 8,074,685 B2 | | 12/2011 | Burton et al. |
| 8,075,186 B2 | | 12/2011 | Borchardt et al. |
| 8,240,112 B2 | | 8/2012 | Binger et al. |
| 8,307,864 B2 | | 11/2012 | Dobkins |
| 8,328,159 B2 | | 12/2012 | Lee |
| 2004/0177771 A1 | | 9/2004 | Small et al. |
| 2007/0187277 A1 | | 8/2007 | Furlong |
| 2007/0193915 A1 | | 8/2007 | Shao |
| 2008/0061063 A1 | | 3/2008 | Kim |
| 2008/0105736 A1 | | 5/2008 | Kalberer |
| 2008/0184899 A1 | * | 8/2008 | Richmond ............. A23B 7/148 99/472 |

OTHER PUBLICATIONS

Maust, Timothy Lewis, Non-Final Office Action. Mail date Nov. 26, 2014. U.S. Appl. No. 13/551,607.

Copenheaver, Blaine R., International Search Report and Written Opinion, PCT/US2013/030607.

Pernice, C., International Search Report, PCT/US00/13850.

* cited by examiner

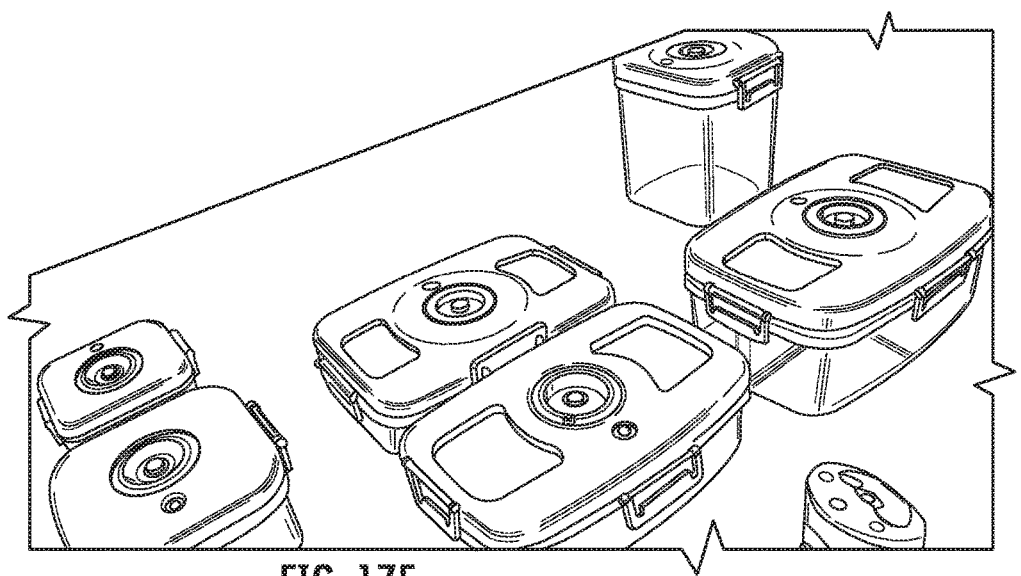
FIG. 17F
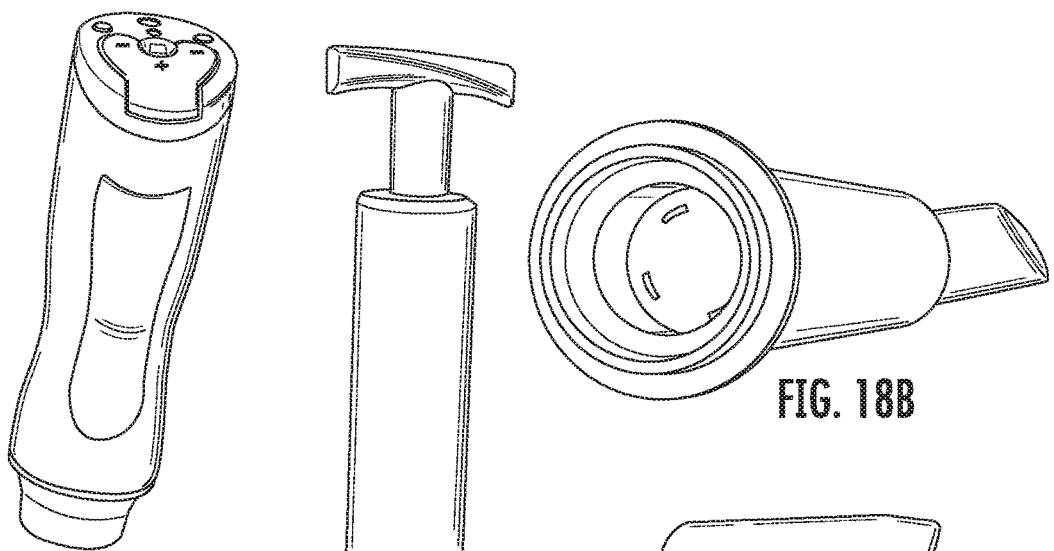
FIG. 17G
FIG. 18A
FIG. 18B
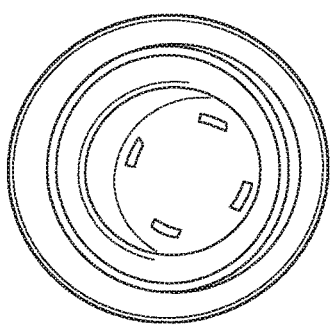
FIG. 18C
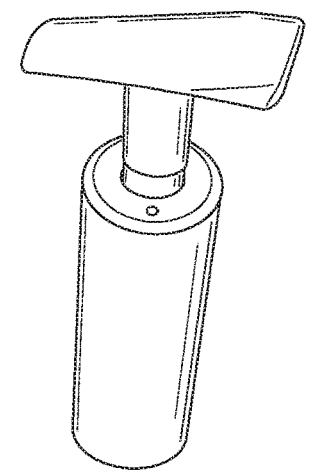
FIG. 18D

SALAD SPINNER

CHOPPER

VACUUM CONTAINER

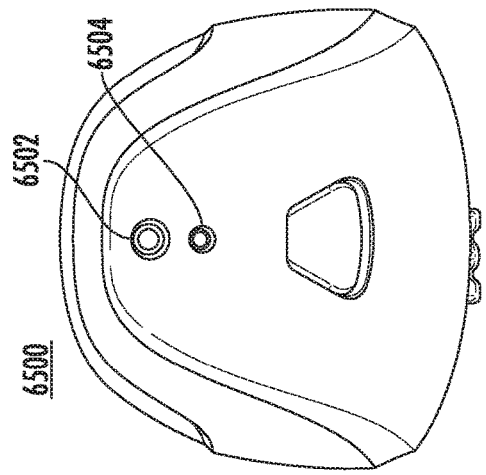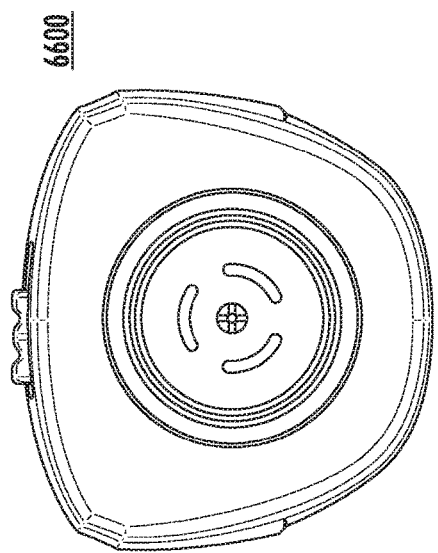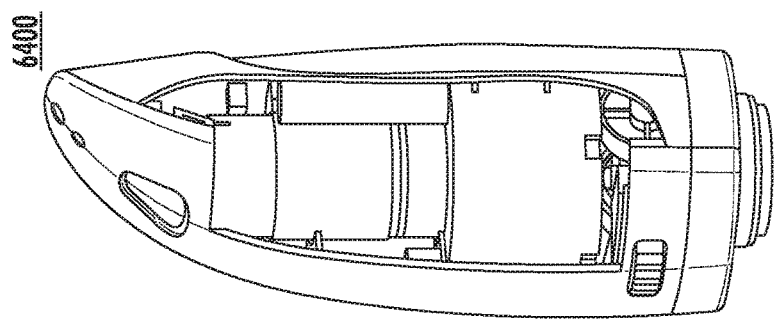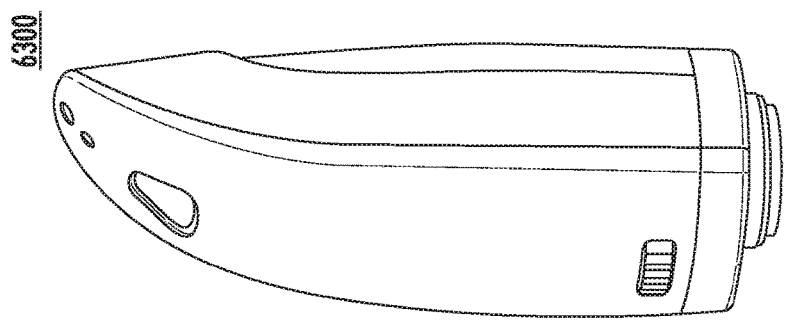

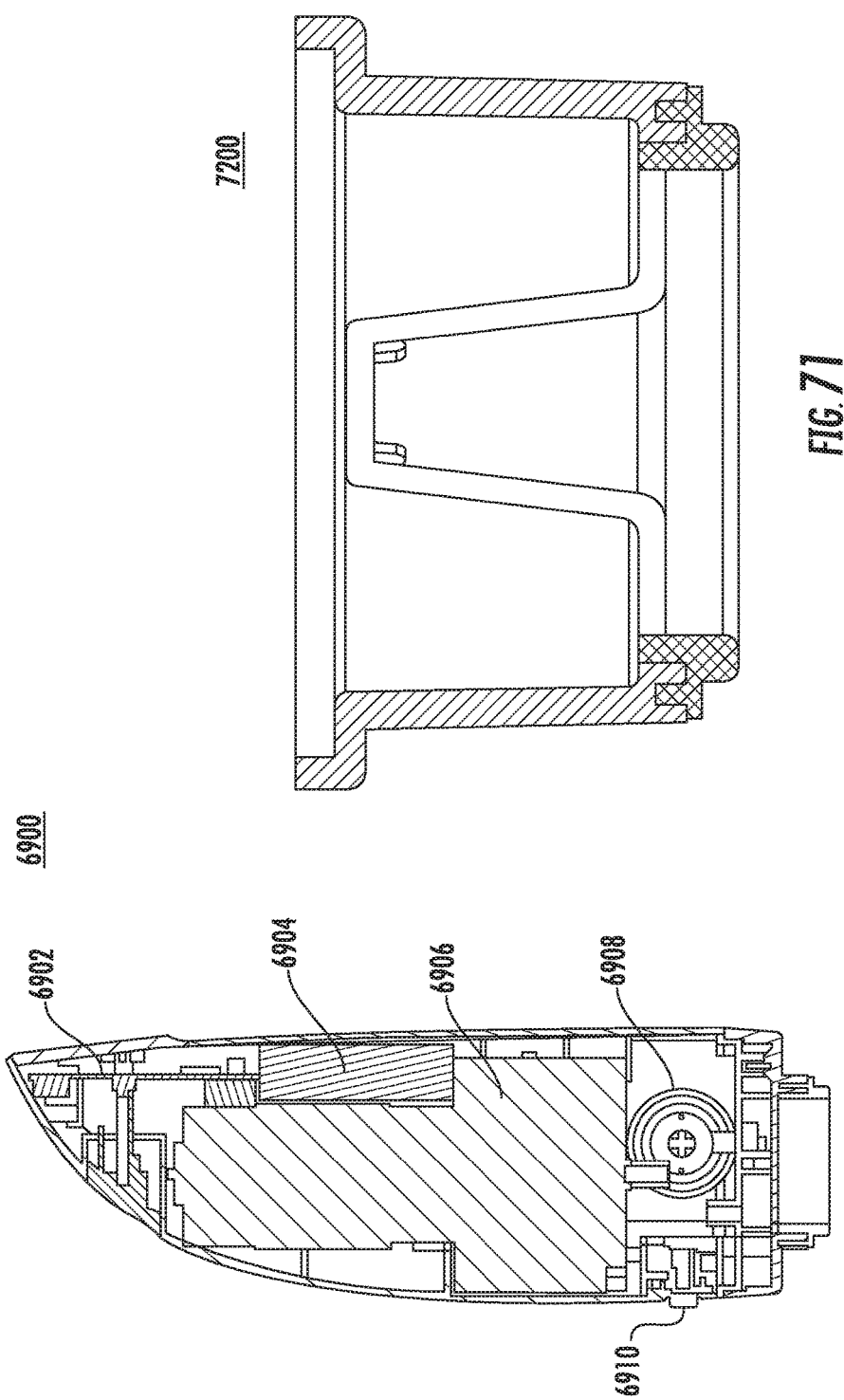

VACUUM CONTAINER, TWIST AND LOCK CAP, BOTTLE LOCKER, FLUID COLLECTOR AND AUTO PUMP

CROSS REFERENCE TO RELATED APPLICATIONS

The present application is a US continuation-in-part of and claims priority under 35 USC 120, of PCT international Patent Application Ser. No. PCT/US2013/030607, filed Mar. 12, 2013, with a priority date of Mar. 12, 2012, which is a continuation-in-part of U.S. patent application Ser. No. 13/551,607, filed Jul. 17, 2012, which claims the benefit under 35 USC 119(e) of U.S. Utility Provisional Patent Application Ser. No. 61/609,453, filed on Mar. 12, 2012, the contents of all of which are incorporated herein by reference in their entirety, and are of common assignee to the present invention.

BACKGROUND

1. Field

The present invention relates to vacuum packaging, and in particular to vacuum packaging for foodstuffs.

2. Related Art

Vacuum packing or vacuum packaging is a method of packaging that removes air from the package prior to sealing. Vacuum packing can involve both rigid and flexible types of packaging. The intent is usually to remove oxygen from the container to extend the shelf life of foods and, with flexible package forms, to reduce the volume of the contents and package.

Vacuum packing reduces atmospheric oxygen, limiting the growth of aerobic bacteria or fungi, and preventing the evaporation of volatile components. Vacuum packing is also commonly used to store of dry foods over a long period of time, foods such as cereals, nuts, cured meats, cheese, smoked fish, coffee, and potato chips (crisps). On a more short term basis, vacuum packing can also be used to store fresh foods, such as vegetables, meats, and liquids, because vacuum packaging inhibits bacterial growth.

Vacuum packing greatly reduces the bulk of non-food items. For example, clothing and bedding can be stored in bags evacuated with a domestic vacuum cleaner or a dedicated vacuum sealer. This technique is sometimes used to compact household waste, for example where a charge is made for each full bag collected.

Vacuum packaging products may include plastic bags; canisters, bottles, or mason jars available for home use.

Vacuum packaging delicate food items can be done by using an inert gas, such as nitrogen. This helps prevent crushing fragile items and delicate foods such as potato chips. Alternatively, vacuum packaging may involve evacuating air from a container by use of a pump.

Conventional vacuum packaging containers have several shortcomings. It would be desirable to provide an improved vacuum packaging container and pump system that overcomes shortcomings of conventional vacuum packaging.

SUMMARY

Further features and/or advantages of, as well as the structure and/or operation of, various exemplary embodiments, are described in detail below with reference to the accompanying drawings.

In an exemplary embodiment, an improved vacuum pump and vacuum container kit are provided.

According to an exemplary embodiment, a manual pump may include a hole to allow the pump to operate more effectively than absent the hole.

According to another exemplary embodiment, a vacuum orifice or opening to a vacuum container may be circular shaped with a cross cut out of the circular opening to allow a vacuum stopper to close the opening while also allowing for ease of release of the vacuum.

A vacuum container and pump system including a vacuum container including: a rounded rectangular or square base with an opening at the top to receive foodstuffs and adapted with an edge; an optional cover comprising at least two locking latches adapted to couple to said edge, said optional cover to close the opening of the vacuum container, said cover comprising: a circular vacuum tubular opening forming a cylindrical hole through said cover, and a cross-shaped notch on the inner cross-section of the tube, through which at least a portion of a plug may be received and disposed when evacuating air from the container.

A vacuum bag comprising: a bag having an opening; a plurality of resealable fasteners; a hole for evacuating air with a pump from the bag; a cap for covering said hole; and a removable clip for easing closure of said plurality of fasteners that is adapted to be used with a plurality of said bags.

A vacuum container according to one exemplary embodiment may further include a twist and lock cap adapted to releasably lock or unlock a silicone plug on the lid of the container, so as to disallow, or allow air to vacuate or evacuate from the container.

In one exemplary embodiment, the vacuum container may further include wherein the twist and lock cap may include at least one opening through which air may move when in an unlocked position, and when the silicone plug is permitted to release the vacuum.

In one exemplary embodiment, the vacuum container may further include wherein the silicone plug is permitted to release the vacuum when a button portion is depressed through an opening in the cap, when the cap is in an unlocked position.

In one exemplary embodiment, the vacuum container may include a twist and lock cap, which may include at least one external handle or protrusion for grasping the cap when twisting to lock or unlock.

In one exemplary embodiment, the vacuum container may include where the cap may include an inner protrusion for coupling with a portion of the cover of the container to lock the cap in place when twisted in a locked position.

In one exemplary embodiment, the vacuum container may include where the inner protrusion(s) may couple with a helical screw shaped protrusion, thread, or other locking mechanism or portion, of the container cover to lock the cap and the plug in place, when the cap is placed in a locked position. The exemplary embodiment avoids accidental release of vacuum from inadvertent hitting of the silicone plug, allows maintaining vacuum for an extended period of time, greater than conventional plug only solutions, and avoids losing the plug when washing a container, as the plug is coupled to the lid and will not wash down a drain when coupled to the lid.

In one exemplary embodiment, the vacuum container may further include a twist and lock cap adapted to at least one of: releasably lock or unlock a silicone plug on the lid of the container, so as to disallow, or allow air to vacuate or evacuate from the container; or couple the silicone plug to the container lid to avoid loss of the silicone plug.

In one exemplary embodiment, the vacuum container may include the twist and lock cap which may include at least one of: at least one opening through which air may move when in an unlocked position, and when the silicone plug is permitted to release the vacuum; wherein the twist and lock cap may include at least one external handle or protrusion for grasping the cap when twisting to lock or unlock; or wherein the cap may include an inner protrusion for coupling with a portion of the cover of the container to lock the cap in place when twisted in a locked position.

In one exemplary embodiment, the vacuum container may include where the silicone plug is permitted to release the vacuum when a button portion is depressed through an opening in the cap, when the cap is in an unlocked position.

In one exemplary embodiment, the vacuum container may include where the cap may include the inner protrusion, and wherein the inner protrusion may couple with a helical screw shaped protrusion on the container cover to lock the cap and the plug in place, when the cap is placed in a locked position.

In one exemplary embodiment, the vacuum container may further include a foodstuff receiving and spinning basket, received within the rectangular container, and a removable container cover may include a mechanism adapted to spin the foodstuff receiving and spinning basket.

In one exemplary embodiment, the vacuum container may further include a foodstuff chopping or cutting cover adapted to cut or chop foodstuff into the vacuum container.

In one exemplary embodiment, the vacuum container may further include being adapted for stacking a plurality of the vacuum containers atop one another.

According to another exemplary embodiment, an improved pump may include, e.g., but not limited to, rechargeable batteries, a switch for different power settings, higher suction levels and additional motors, according to exemplary embodiments.

According to another exemplary embodiment, an exemplary vacuum bag may include: a vacuum bag having an opening; a plurality of resealable fasteners; a interface for evacuating air with a pump from the bag; a cap for covering the interface; and a removable clip for easing closure of the plurality of fasteners that is adapted to be used with a plurality of the vacuum bags.

According to another exemplary embodiment, the vacuum container may include where the electrically powered air evacuation pump is adapted to be coupled to and used in combination with at least one fluid collecting container.

According to another exemplary embodiment, the vacuum container may include where the at least one fluid collecting container may include: at least one outer ring adapted to couple the pump to the vacuum container; and at least one inner raised portion comprising: at least one hole, and forming a channel between the at least one outer ring to capture fluid or liquid, where the at least one inner raised portion may include at least one of: a cylindrical shaped raised portion, or a conical raised portion.

According to another exemplary embodiment, the vacuum container may include where the at least one fluid or liquid collecting container may include the at least one hole, which may include at least three holes.

According to another exemplary embodiment, an exemplary bottle locking apparatus may include: a frustro-conical shaped cork adapted to fit within a bottle opening comprising at least one substantially cylindrical opening therethrough; and at least one plug disposed within the at least substantially cylindrical opening, the plug adapted to permit evacuating air from the bottle when used with the pump, and adapted to permit releasing the vacuum from the bottle.

BRIEF DESCRIPTION OF THE DRAWINGS

The foregoing and other features and/or advantages of the invention will be apparent from the following, more particular description of exemplary embodiments of the invention, as illustrated in the accompanying drawings. In the drawings, like reference numbers generally indicate identical, functionally similar, and/or structurally similar elements. A preferred and various other exemplary embodiments are discussed below in the detailed description of the following drawings:

FIG. 17F depicts an exemplary embodiment of a kit of various sized containers and an exemplary pump as may be sold in an exemplary kit including a plurality of rectangular and square containers, which according to an exemplary embodiment may be adapted for stacking, and may be shaped to take advantage of rectangular or square space in a refrigerator and/or for storage, according to an exemplary embodiment;

FIG. 17G depicts an exemplary pump according to an exemplary embodiment;

FIG. 18A depicts an exemplary front view of an exemplary manual vacuum pump, which may be adapted to extract air while pumping, and may in an exemplary embodiment be adapted to include an exemplary hole to improve air extraction as illustrated in FIG. 18G, according to an exemplary embodiment;

FIG. 18B depicts an exemplary isometric bottom and side view of an exemplary manual vacuum pump, which may be adapted to extract air while pumping, drawing air in through an exemplary plurality of holes on an exemplary inner surface of the pump, in an exemplary inner cavity, according to an exemplary embodiment;

FIG. 18C depicts an exemplary partial bottom view of an exemplary manual vacuum pump, which illustrates an exemplary four inlet holes for drawing in air when pumping air with the pump out of an exemplary vacuum container such as, e.g., but not limited to, the container of FIGS. 1-17 above, according to an exemplary embodiment;

FIGS. 18D and 18E depict an exemplary top view of exemplary manual pumps illustrating an exemplary air hole for allowing improved air release from the pump, when air is taken in through exemplary inlet holes from the exemplary pump, and then may be released through the exemplary one or more outlet holes, alternatively, air may be released around the handle, but performance of the pump may improve from use of the exemplary outlet hole, according to an exemplary embodiment. The pump may also include a syringe like internal plunger, not shown; as may be used to create the vacuum to draw out the air, according to one exemplary embodiment. According to another exemplary embodiment, other pumps as will be apparent to those skilled in the art may be used such as, e.g., but not limited to, one directional valves, etc.;

FIGS. 27A and 27B also illustrate a circular indentation in the bottom of the container (see circular light reflection on FIG. 27B, and outer circle of FIG. 26), the large circular indentation is also shown on an exemplary rectangular container in FIG. 27C, as well as FIG. 12B, according to an exemplary embodiment;

FIG. 62 illustrates an exemplary isometric view of an exemplary autopump, according to an exemplary embodiment;

FIG. 63 depicts a partial cutaway view illustrating various exemplary internal portions of the vacuum pump, according to an exemplary embodiment;

FIG. 64 depicts an exemplary orthographic top view of the exemplary autopump including an exemplary adapter power plug port, into which a power supply source plug may be inserted, and further illustrating an exemplary output, in this case an exemplary LED light or lamp, according to an exemplary embodiment;

FIG. 65 depicts an exemplary orthographic bottom view of the exemplary autopump, according to an exemplary embodiment;

FIG. 68 depicts a cross-sectional view depicting an exemplary control printed circuit board (PCB), an exemplary rechargeable battery; an exemplary vacuum pump, an exemplary pressure switch, according to an exemplary embodiment;

FIG. 71 depicts an exemplary cross-section view of the exemplary liquid collecting or capturing container or cap, according to an exemplary embodiment.

DETAILED DESCRIPTION OF VARIOUS EXEMPLARY EMBODIMENTS

The following detailed description of various preferred exemplary embodiments as well as various other exemplary embodiments, in conjunction with the accompanying claims and/or drawings describes the invention in which like numerals in the several views refer to corresponding or similar parts. The present invention broadly represents applicable improvements to an apparatus and/or methods relating to a vacuum container and pump system or kit. The embodiments detailed herein are intended to be taken as representative or exemplary of those in which the improvements of the embodiments may be incorporated and are not intended to be limiting.

A vacuum container and pump system including a vacuum container including: a rounded rectangular or square base with an opening at the top to receive foodstuffs and adapted with an edge; an optional cover comprising at least two locking latches adapted to couple to said edge, said optional cover to close the opening of the vacuum container, said cover comprising: a circular vacuum tubular opening forming a cylindrical hole through said cover, and a cross-shaped notch on the inner cross-section of the tube, through which at least a portion of a plug may be received and disposed when evacuating air from the container.

A vacuum bag comprising: a bag having an opening; a plurality of resealable fasteners; a hole for evacuating air with a pump from the bag; a cap for covering said hole; and a removable clip for easing closure of said plurality of fasteners that is adapted to be used with a plurality of said bags.

Figure 1:
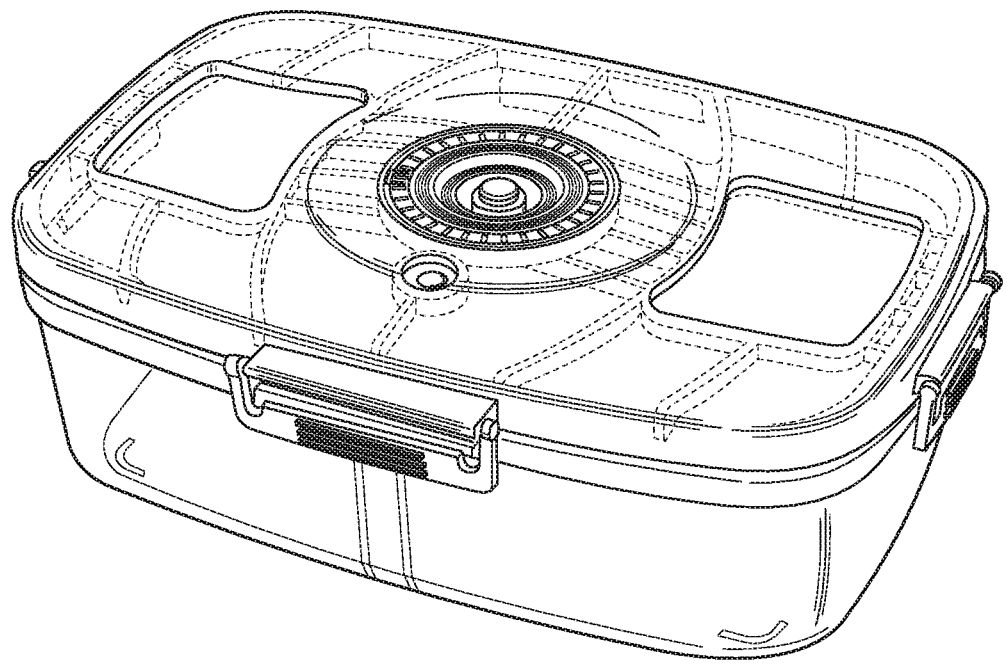
FIG. 1 depicts an exemplary rounded rectangular vacuum container according to an exemplary embodiment, the exemplary container illustrated having an exemplary lid with exemplary four latches adapted to be coupled to an outer edge of a base, an exemplary annular dial with day indicator adapted to be usable to track age of container contents, a clear transparent plastic bottom which may be adapted for stacking, and the exemplary lid as illustrated includes an exemplary teal colored partially convex rounded lid with circular vacuum interface, vacuum indicator, and vacuum release, with exemplary annular concave slot for receiving an exemplary convex annular protrusion from the bottom of another such container for stacking, as described further with reference to FIG. 19L below, according to an exemplary embodiment.
Figure 19A:
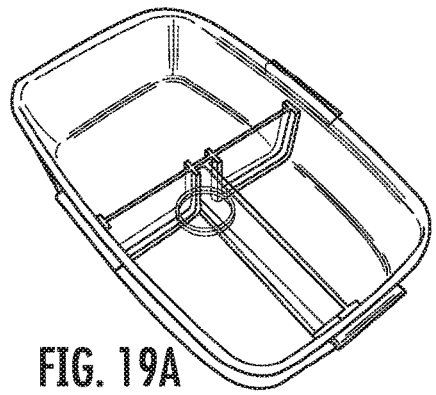
FIGS. 19A, 19B, 19C, 19D, 19E and 19F illustrate exemplary isometric views of an exemplary inner surface of an exemplary rectangular container, adapted to receive an exemplary removable, exemplary multiple-part, exemplary divider/separator members as illustrated in FIG. 19K, as may be used to create two or more separate areas within the exemplary vacuum container, including in an exemplary embodiment a reversible half length member and an exemplary width long divider member adapted to receive the half length divider member on one side as illustrated in 19A and B, and as removed in 19B and 19C, may be reinserted as shown in 19F, or the inner width member may be removed as illustrated in 19D to have a full container as illustrated in FIG. 19E which illustrates also exemplary ribs in the sides of both the long and short sides to receive the exemplary removable divider members, according to an exemplary embodiment.
Figure 19B:
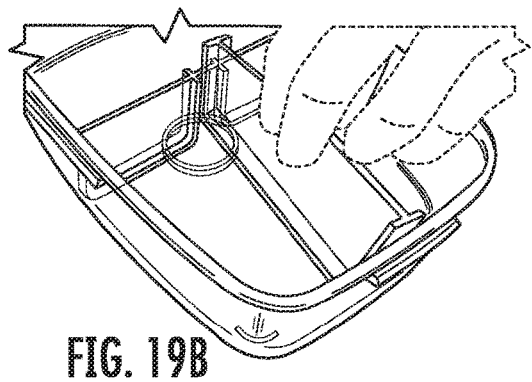
Figure 19C:
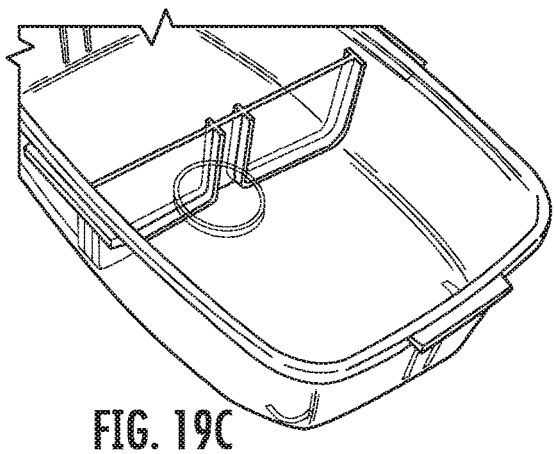
Figure 19D:
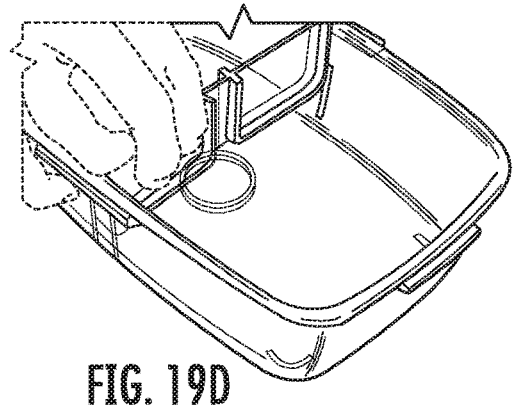
Figure 19E:
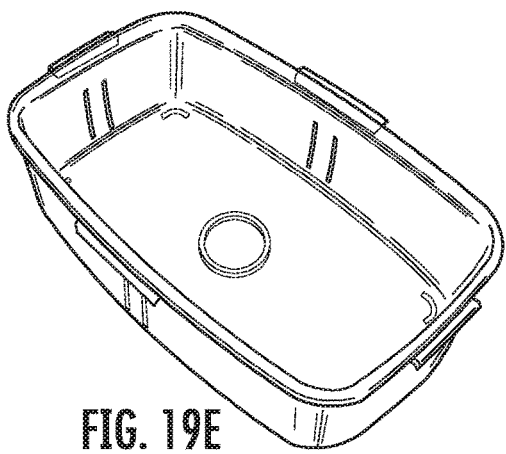
Figure 19F:
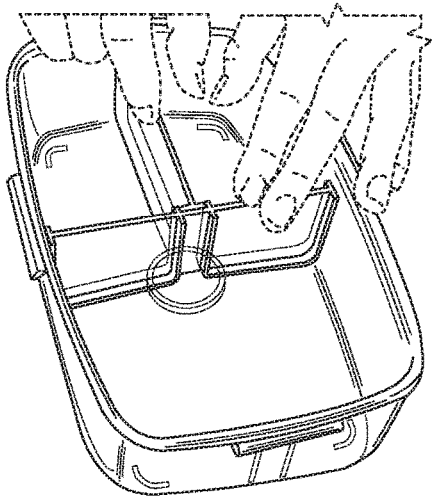
Figure 19G:
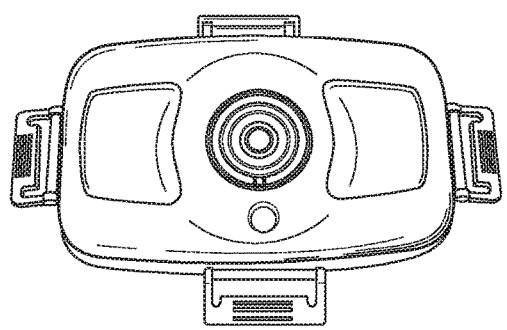
FIG. 19G illustrates an exemplary top view of an exemplary lid illustrating exemplary four latches adapted to be coupled to one or more rims or protrusions of a rim of an exemplary vacuum container bottom as illustrated in FIGS. 19H (shallow depth) and 19I (deep depth) according to an exemplary embodiment.
Figure 19H:
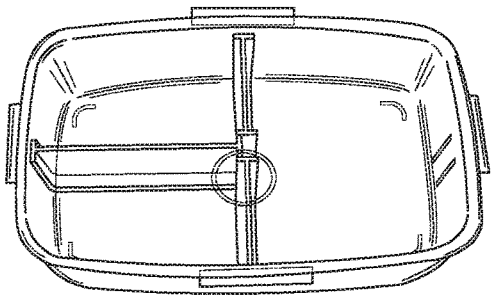
FIG. 19H illustrates an exemplary vacuum container bottom (shallow depth) for coupling to the lid of FIG. 19G.
Figure 19I:
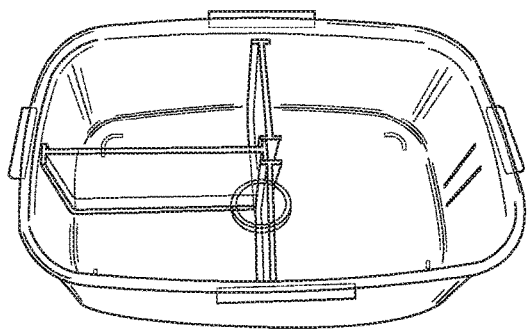
FIG. 19I illustrates an exemplary vacuum container bottom (deep depth) for coupling to the lid of FIG. 19G.
Figure 19J:
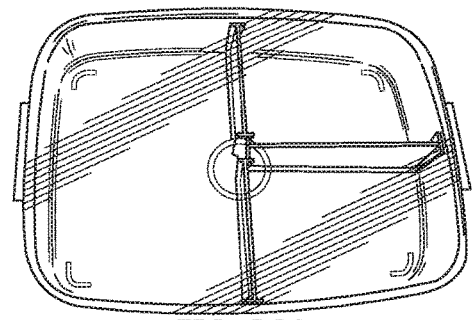
FIG. 19J illustrates an exemplary nonremovable divider in an exemplary container, according to an exemplary embodiment.
Figure 19K:
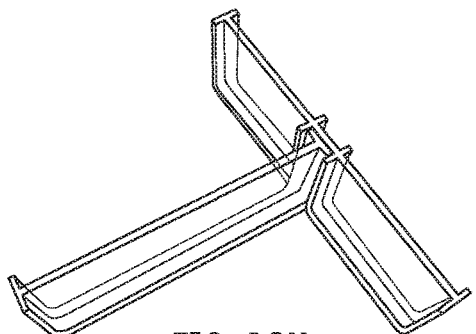
FIG. 19K illustrates an exemplary two part divider removed from a container illustrating a t-shaped bottom cross section for providing rigidity and to support the divider members, and for interlocking into the ribbed protrusions in the exemplary inner edge of the contain as shown in FIG. 19L according to an exemplary embodiment.
Figure 19L:
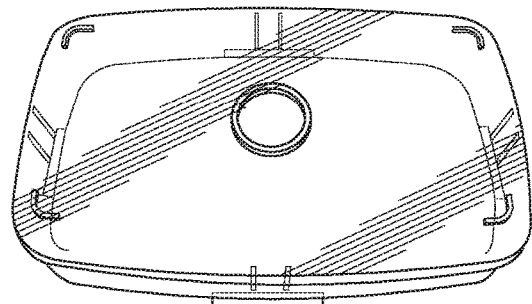
FIG. 19L illustrates an exemplary bottom view of an exemplary vacuum container illustrating exemplary feet and an exemplary circular indentation to receive a rounded lid while stacking and an exemplary annular protrusion of sufficient depth to permit securing when stacking and placed in a respective annual cavity surrounding part of an exemplary lid's vacuum interface as shown, e.g., in the top view of FIG. 19G, to secure to one another stacked containers in evacuated vacuum state, a respective pair of such containers; according to an exemplary embodiment.

FIG. 1 depicts an exemplary rounded rectangular vacuum container according to an exemplary embodiment, the exemplary container illustrated having an exemplary lid with exemplary four latches adapted to be coupled to an outer edge of a base, an exemplary annular dial with day indicator adapted to be usable to track age of container contents, a clear transparent plastic bottom which may be adapted for stacking, and the exemplary lid as illustrated includes an exemplary teal colored partially convex rounded lid with circular vacuum interface, vacuum indicator, and vacuum release, with exemplary annular concave slot for receiving an exemplary convex annular protrusion from the bottom of another such container for stacking, as described further with reference to FIG. 19L below, according to an exemplary embodiment.

Figure 2:
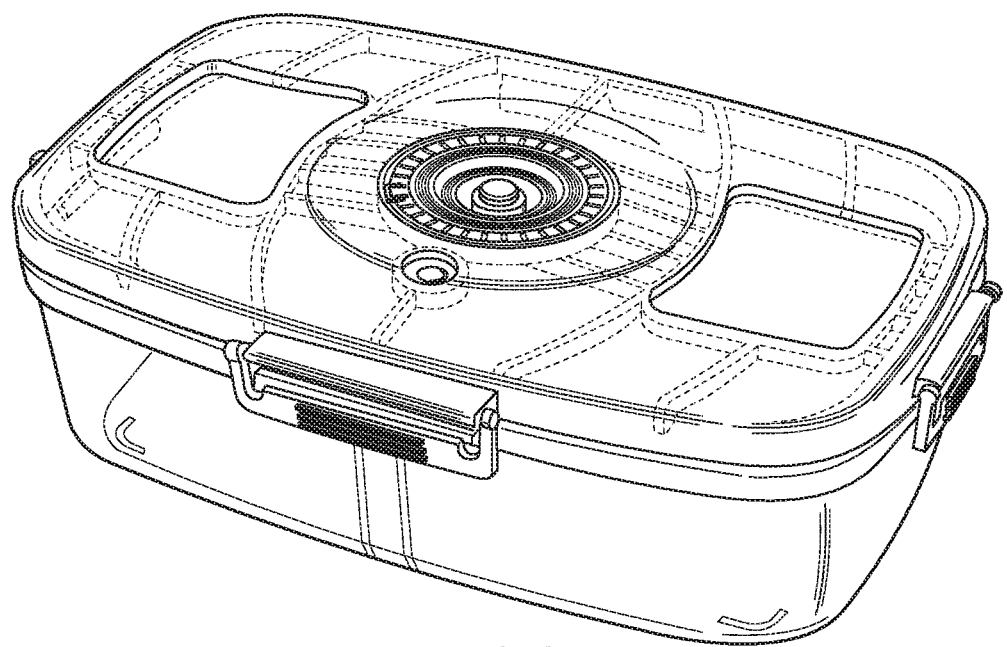
FIG. 2 illustrates another exemplary rounded rectangular vacuum container similar to that shown in FIG. 1, of shallower depth, according to an exemplary embodiment.

FIG. 2 illustrates another exemplary rounded rectangular vacuum container similar to that shown in FIG. 1, of shallower depth, according to an exemplary embodiment.

Figure 3:
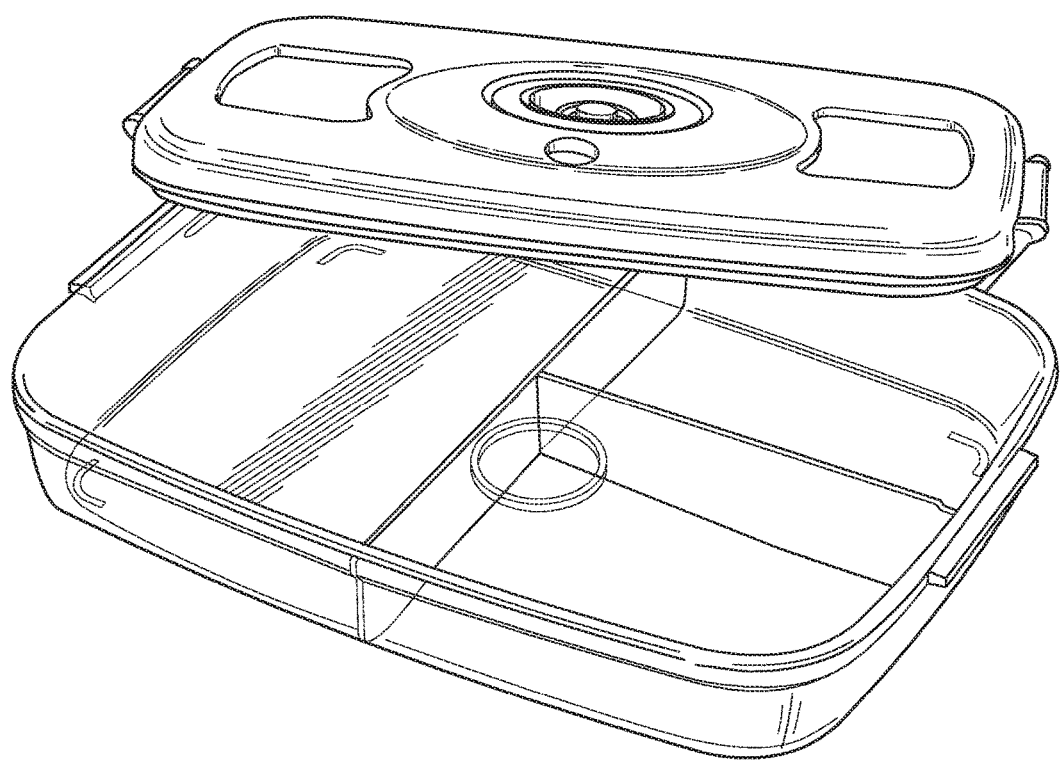
FIG. 3 illustrates an exemplary rounded rectangular vacuum container having only exemplary 2 latches, and including a t-shaped divider, according to an exemplary embodiment, which in various exemplary embodiments may be either removable or permanent, and the container may be adapted to be stacked compatibly with the containers of FIGS. 1 and 2, according to an exemplary embodiment.

FIG. 3 illustrates an exemplary rounded rectangular vacuum container having only exemplary 2 latches, and including a t-shaped divider, according to an exemplary embodiment, which in various exemplary embodiments may be either removable or permanent, and the container may be adapted to be stacked compatibly with the containers of FIGS. 1 and 2, according to an exemplary embodiment.

Figure 4A:
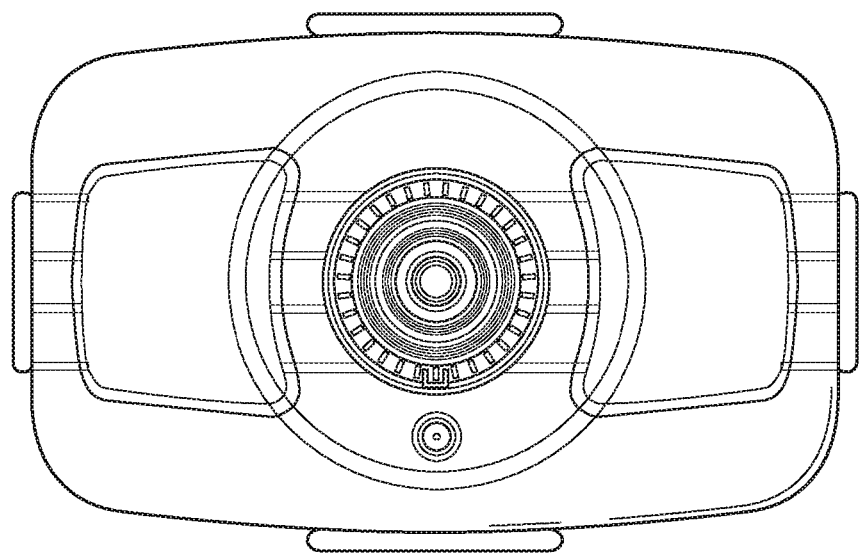
FIG. 4A depicts an exemplary top orthogonal view of the exemplary rounded rectangular vacuum container as depicted in FIG. 1 above, according to an exemplary embodiment.

FIG. 4A depicts an exemplary top orthogonal view of the exemplary rounded rectangular vacuum container as depicted in FIG. 1 above, according to an exemplary embodiment.

Figure 5A:
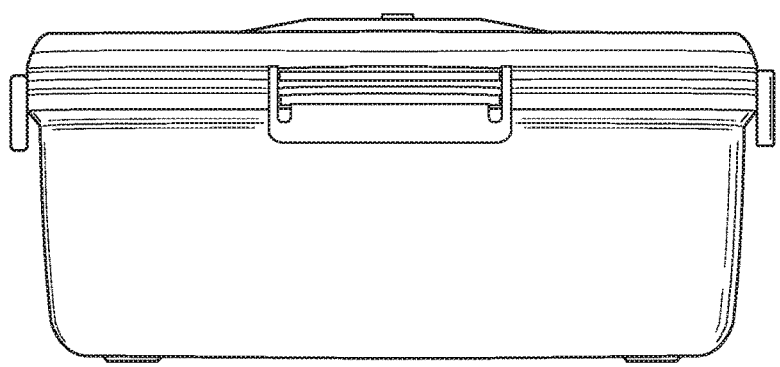
FIG. 5A depicts an exemplary front orthogonal view of the exemplary rounded rectangular vacuum container as depicted in FIG. 1 above, according to an exemplary embodiment. According to another exemplary embodiment, the base may include an annular protrusion (not shown, but illustrated in FIG. 19L) adapted for stacking.

FIG. 5A depicts an exemplary front orthogonal view of the exemplary rounded rectangular vacuum container as depicted in FIG. 1 above, according to an exemplary embodiment. According to another exemplary embodiment, the base may include an annular protrusion (not shown, but illustrated in FIG. 19L) adapted for stacking.

Figure 6A:
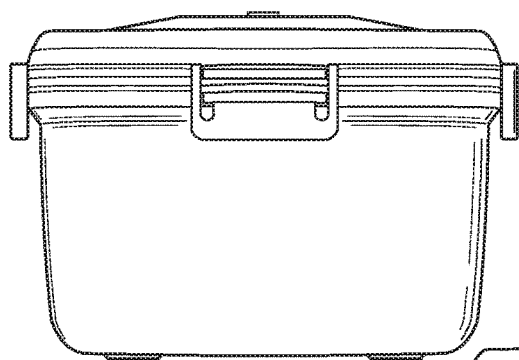
FIG. 6A depicts an exemplary side orthogonal view of the exemplary rounded rectangular vacuum container as depicted in FIG. 1 above, according to an exemplary embodiment. According to another exemplary embodiment, the base may include an annular protrusion (not shown, but illustrated in FIG. 19L) adapted for stacking.

FIG. 6A depicts an exemplary side orthogonal view of the exemplary rounded rectangular vacuum container as depicted in FIG. 1 above, according to an exemplary embodiment. According to another exemplary embodiment, the base may include an annular protrusion (not shown, but illustrated in FIG. 19L) adapted for stacking.

Figure 4B:
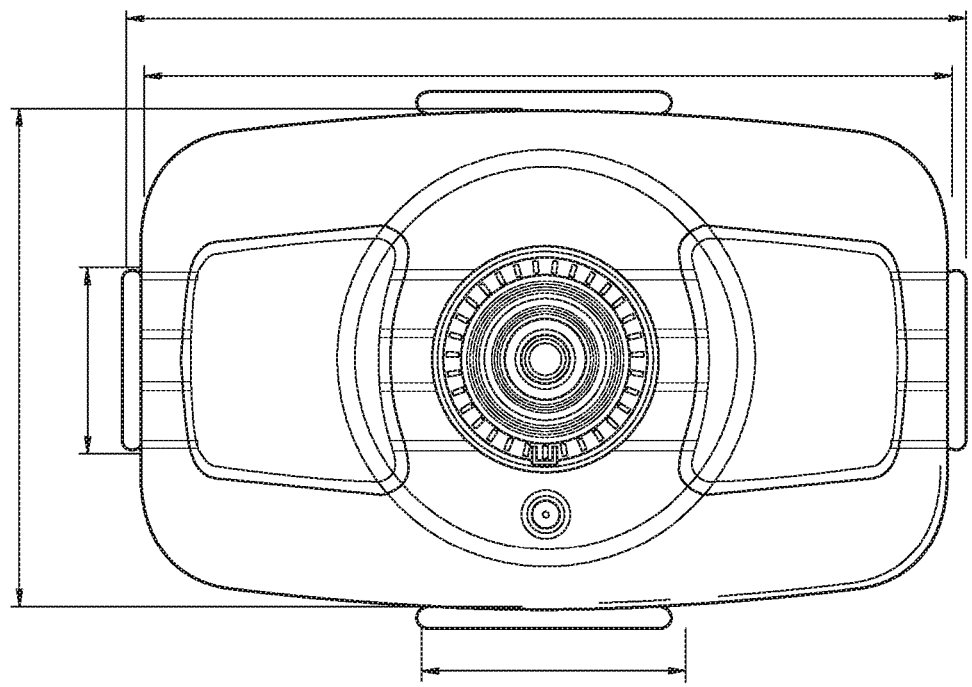
FIG. 4B depicts an exemplary top orthogonal view of the exemplary rounded rectangular vacuum container as depicted in FIG. 1 and FIG. 4A above, including exemplary, but nonlimiting dimensions, according to an exemplary embodiment.

FIG. 4B depicts an exemplary top orthogonal view of the exemplary rounded rectangular vacuum container as depicted in FIG. 1 and FIG. 4A above, including exemplary, but nonlimiting dimensions, according to an exemplary embodiment.

Figure 5B:
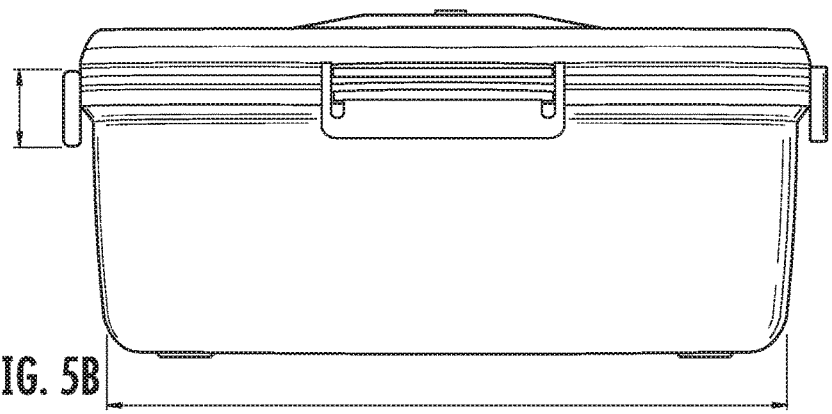
FIG. 5B depicts an exemplary front orthogonal view of the exemplary rounded rectangular vacuum container as depicted in FIG. 1 above and FIG. 5A above, including exemplary, but nonlimiting dimensions, according to an exemplary embodiment. According to another exemplary embodiment, the base may include an annular protrusion (not shown, but illustrated in FIG. 19I) adapted for stacking.

FIG. 5B depicts an exemplary front orthogonal view of the exemplary rounded rectangular vacuum container as depicted in FIG. 1 above and FIG. 5A above, including exemplary, but nonlimiting dimensions, according to an exemplary embodiment. According to another exemplary embodiment, the base may include an annular protrusion (not shown, but illustrated in FIG. 19I) adapted for stacking.

Figure 6B:
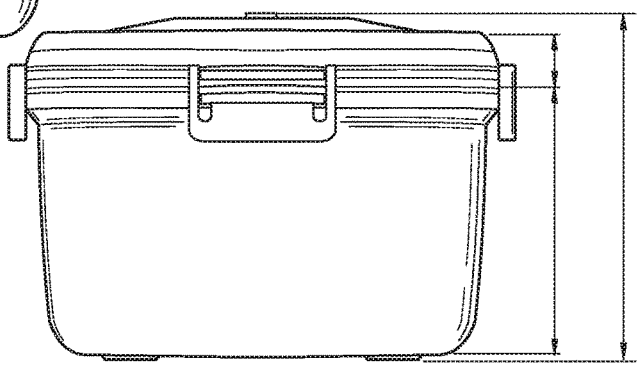
FIG. 6B depicts an exemplary side orthogonal view of the exemplary rounded rectangular vacuum container as depicted in FIG. 1 above and FIG. 6A above, including exemplary, but nonlimiting dimensions, according to an exemplary embodiment. According to another exemplary embodiment, the base may include an annular protrusion (not shown, but illustrated in FIG. 19I) adapted for stacking.

FIG. 6B depicts an exemplary side orthogonal view of the exemplary rounded rectangular vacuum container as depicted in FIG. 1 above and FIG. 6A above, including exemplary, but nonlimiting dimensions, according to an exemplary embodiment. According to another exemplary embodiment, the base may include an annular protrusion (not shown, but illustrated in FIG. 19I) adapted for stacking.

Figure 7A:
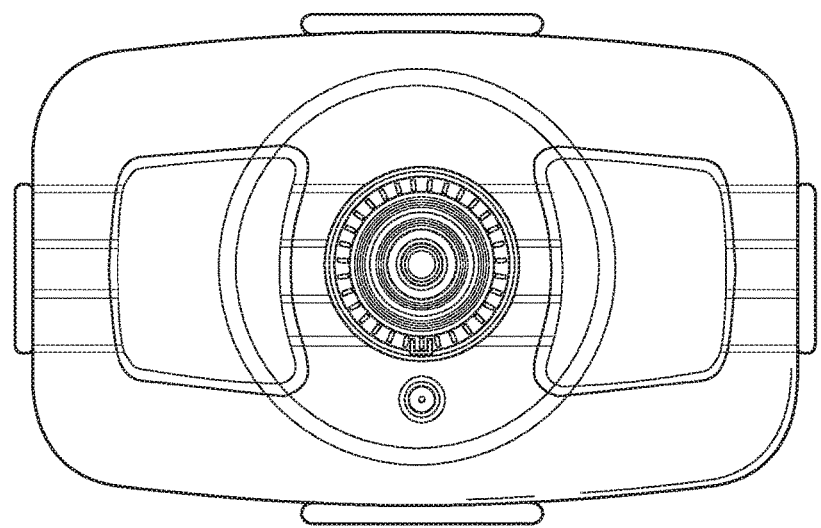
FIG. 7A depicts an exemplary top orthogonal view of the exemplary rounded rectangular vacuum container as depicted in FIG. 2 above, according to an exemplary embodiment.

FIG. 7A depicts an exemplary top orthogonal view of the exemplary rounded rectangular vacuum container as depicted in FIG. 2 above, according to an exemplary embodiment.

Figure 8A:
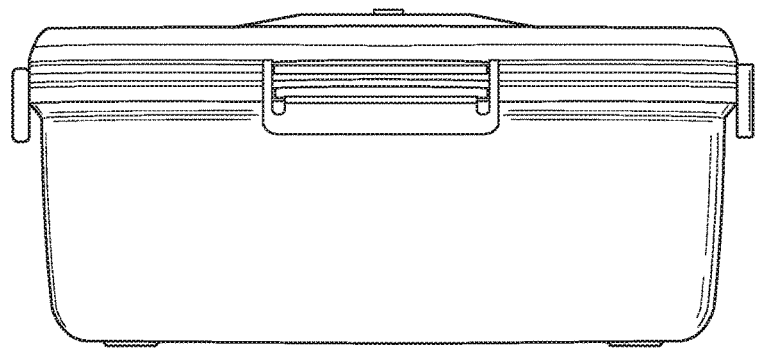
FIG. 8A depicts an exemplary front orthogonal view of the exemplary rounded rectangular vacuum container as depicted in FIG. 2 above, according to an exemplary embodiment. According to another exemplary embodiment, the base may include an annular protrusion (not shown, but illustrated in FIG. 19I) adapted for stacking.

FIG. 8A depicts an exemplary front orthogonal view of the exemplary rounded rectangular vacuum container as depicted in FIG. 2 above, according to an exemplary embodiment. According to another exemplary embodiment, the base may include an annular protrusion (not shown, but illustrated in FIG. 19I) adapted for stacking.

Figure 9A:
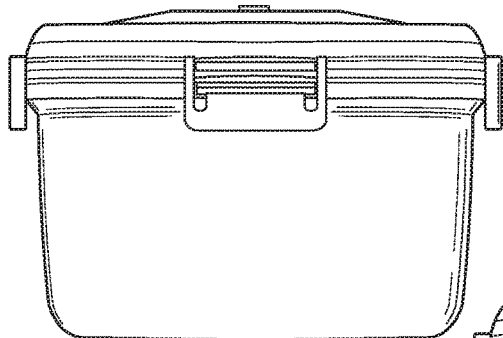
FIG. 9A depicts an exemplary side orthogonal view of the exemplary rounded rectangular vacuum container as depicted in FIG. 2 above, according to an exemplary embodiment. According to another exemplary embodiment, the base may include an annular protrusion (not shown, but illustrated in FIG. 19I) adapted for stacking.

FIG. 9A depicts an exemplary side orthogonal view of the exemplary rounded rectangular vacuum container as depicted in FIG. 2 above, according to an exemplary embodiment. According to another exemplary embodiment, the base may include an annular protrusion (not shown, hut illustrated in FIG. 19I) adapted for stacking.

Figure 7B:
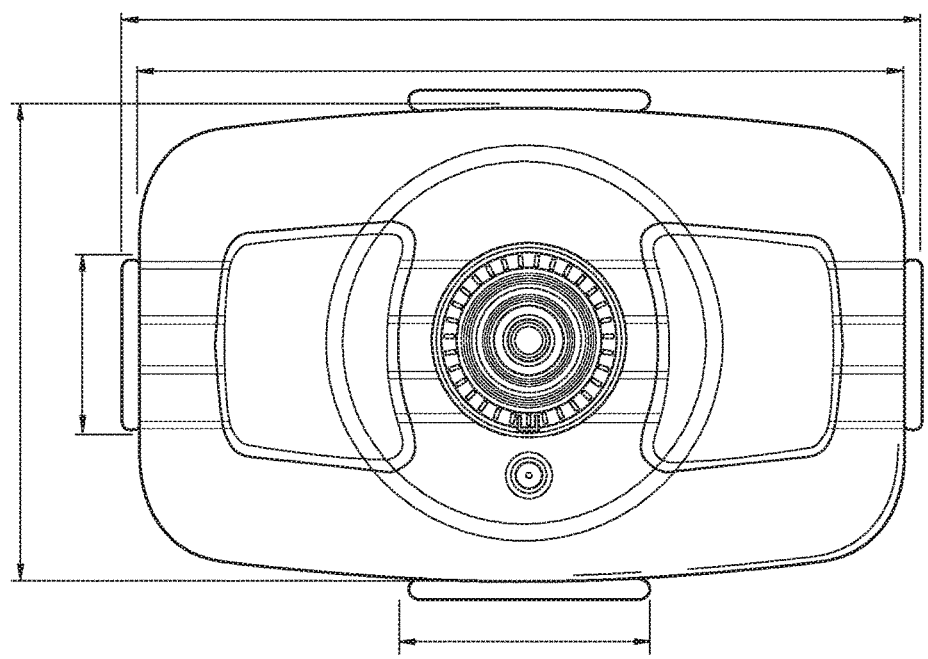
FIG. 7B depicts an exemplary top orthogonal view of the exemplary rounded rectangular vacuum container as depicted in FIG. 2 and FIG. 7A above, including exemplary, but nonlimiting dimensions, according to an exemplary embodiment.

FIG. 7B depicts an exemplary top orthogonal view of the exemplary rounded rectangular vacuum container as depicted in FIG. 2 and FIG. 7A above, including exemplary, but nonlimiting dimensions, according to an exemplary embodiment.

Figure 8B:
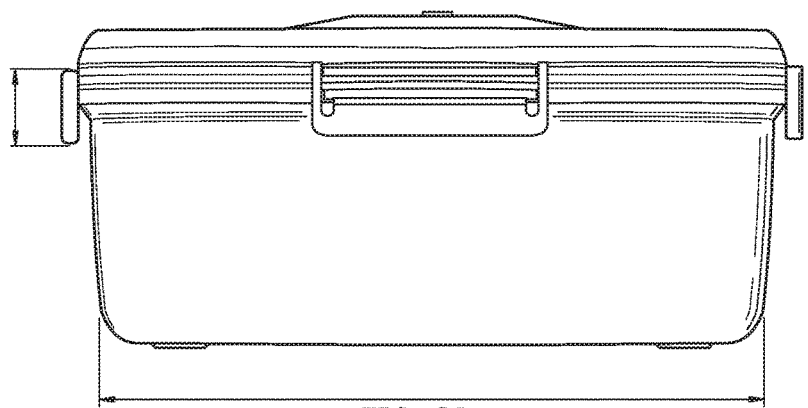
FIG. 8B depicts an exemplary front orthogonal view of the exemplary rounded rectangular vacuum container as depicted in FIG. 2 above and FIG. 8A above, including exemplary, but nonlimiting dimensions, according to an exemplary embodiment. According to another exemplary embodiment, the base may include an annular protrusion (not shown, but illustrated in FIG. 19I) adapted for stacking.

FIG. 8B depicts an exemplary front orthogonal view of the exemplary rounded rectangular vacuum container as depicted in FIG. 2 above and FIG. 8A above, including exemplary, but nonlimiting dimensions, according to an exemplary embodiment. According to another exemplary embodiment, the base may include an annular protrusion (not shown, but illustrated in FIG. 19I) adapted for stacking.

Figure 9B:
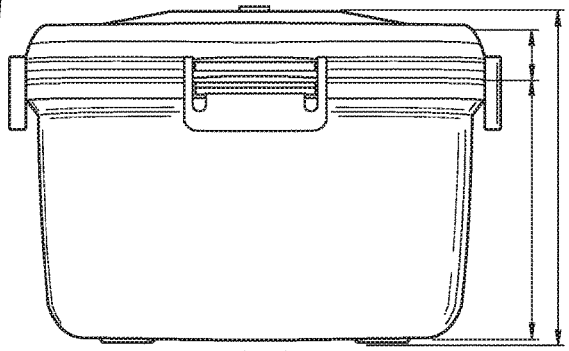
FIG. 9B depicts an exemplary side orthogonal view of the exemplary rounded rectangular vacuum container as depicted in FIG. 2 above and FIG. 9A above, including exemplary, but nonlimiting dimensions, according to an exemplary embodiment. According to another exemplary embodiment, the base may include an annular protrusion (not shown, but illustrated in FIG. 19I) adapted for stacking.

FIG. 9B depicts an exemplary side orthogonal view of the exemplary rounded rectangular vacuum container as depicted in FIG. 2 above and FIG. 9A above, including exemplary, but nonlimiting dimensions, according to an exemplary embodiment. According to another exemplary embodiment, the base may include an annular protrusion (not shown, but illustrated in FIG. 19I) adapted for stacking.

Figure 10:
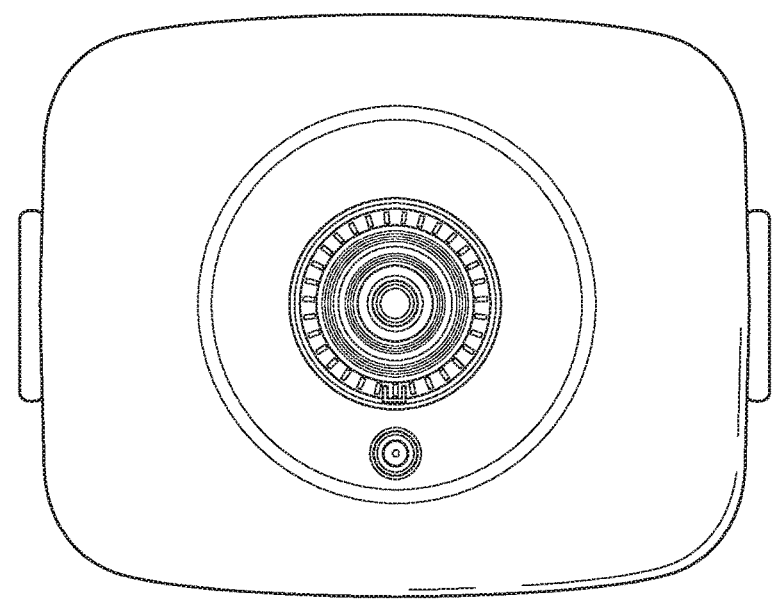
FIG. 10 depicts an exemplary top orthogonal view of the exemplary rounded rectangular vacuum container as depicted in FIG. 3 above, according to an exemplary embodiment.

FIG. 10 depicts an exemplary top orthogonal view of the exemplary rounded rectangular vacuum container as depicted in FIG. 3 above, according to an exemplary embodiment.

Figure 11:
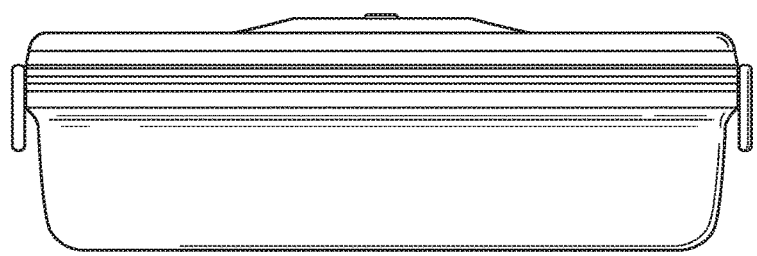
FIG. 11 depicts an exemplary front orthogonal view of the exemplary rounded rectangular vacuum container as depicted in FIG. 3 above, according to an exemplary embodiment. According to another exemplary embodiment, the base may include an annular protrusion (not shown, but illustrated in FIG. 19I) adapted for stacking.

FIG. 11 depicts an exemplary front orthogonal view of the exemplary rounded rectangular vacuum container as depicted in FIG. 3 above, according to an exemplary embodiment. According to another exemplary embodiment, the base may include an annular protrusion (not shown, but illustrated in FIG. 19I) adapted for stacking.

Figure 12A:
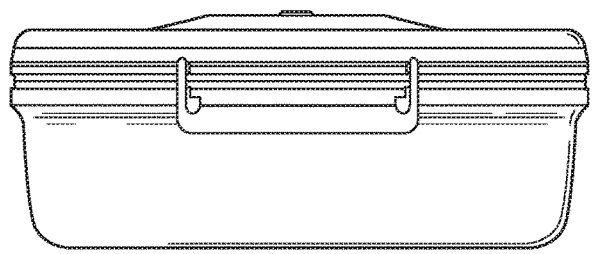
FIG. 12A depicts an exemplary side orthogonal view of the exemplary rounded rectangular vacuum container as depicted in FIG. 3 above, according to an exemplary embodiment. According to another exemplary embodiment, the base may include an annular protrusion (not shown, but illustrated in FIG. 19I) adapted for stacking.

FIG. 12A depicts an exemplary side orthogonal view of the exemplary rounded rectangular vacuum container as depicted in FIG. 3 above, according to an exemplary embodiment. According to another exemplary embodiment, the base may include an annular protrusion (not shown, but illustrated in FIG. 19I) adapted for stacking.

Figure 12B:
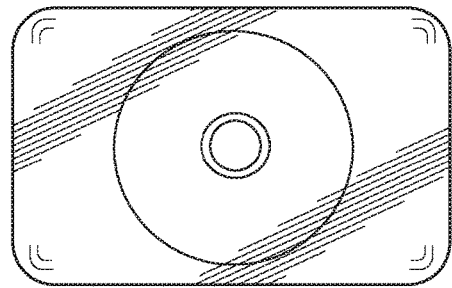
FIG. 12B depicts an exemplary bottom view of an exemplary base as may be used in an exemplary rectangular container as shown in the above FIGS. 1-12, and may include exemplary one or more exemplary feet, an exemplary and optional circular concave indentation to accommodate receiving the exemplary circular rounded cover of another container for stacking, and an exemplary annular inner protrusion that may be adapted in be placed into the vacuum interface annular cavity of an exemplary lid of another vacuum container adapted for stacking, and sufficiently deep to allow stacking even when a pair of respective container are in an evacuated state causing the respective outer surfaces to collapse slightly from the vacuum pressure, according to an exemplary embodiment.

FIG. 12B depicts an exemplary bottom view of an exemplary base as may be used in an exemplary rectangular container as shown in the above FIGS. 1-12, and may include exemplary one or more exemplary feet, an exemplary and optional circular concave indentation to accommodate receiving the exemplary circular rounded cover of another container for stacking, and an exemplary annular inner protrusion that may be adapted in be placed into the vacuum interface annular cavity of an exemplary lid of another vacuum container adapted for stacking, and sufficiently deep to allow stacking even when a pair of respective container are in an evacuated state causing the respective outer surfaces to collapse slightly from the vacuum pressure, according to an exemplary embodiment.

Figure 13:
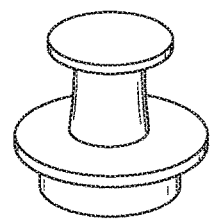
FIG. 13 illustrates an exemplary isometric view of an exemplary silicone exemplary vacuum plug as may be used to maintain; and/or release a vacuum from an exemplary container.

FIG. 13 illustrates an exemplary isometric view of an exemplary silicone exemplary vacuum plug as may be used to maintain, and/or release a vacuum from an exemplary container.

Figure 14A:
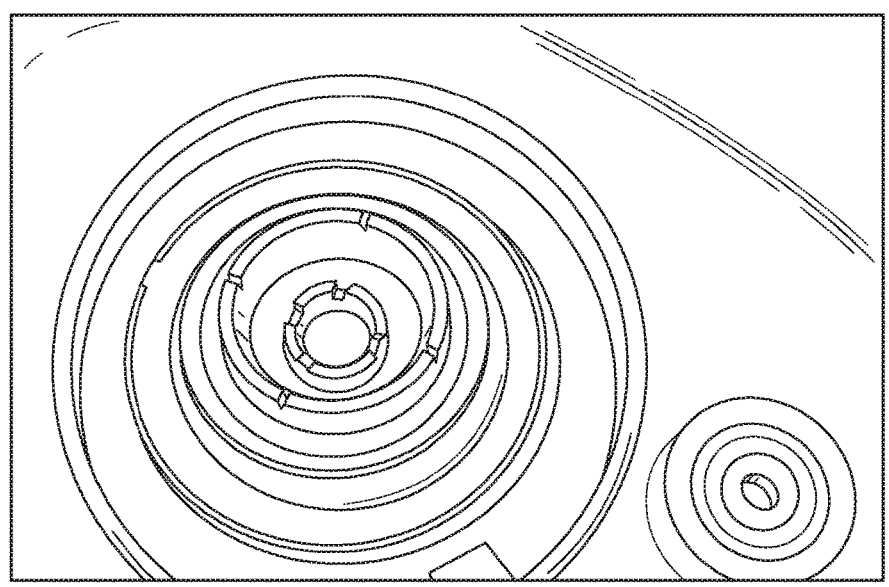
FIGS. 14A and 14B depict an exemplary embodiments of the exemplary undersides of the exemplary vacuum interface and exemplary vacuum indicator, according to an exemplary embodiment.
Figure 14B:
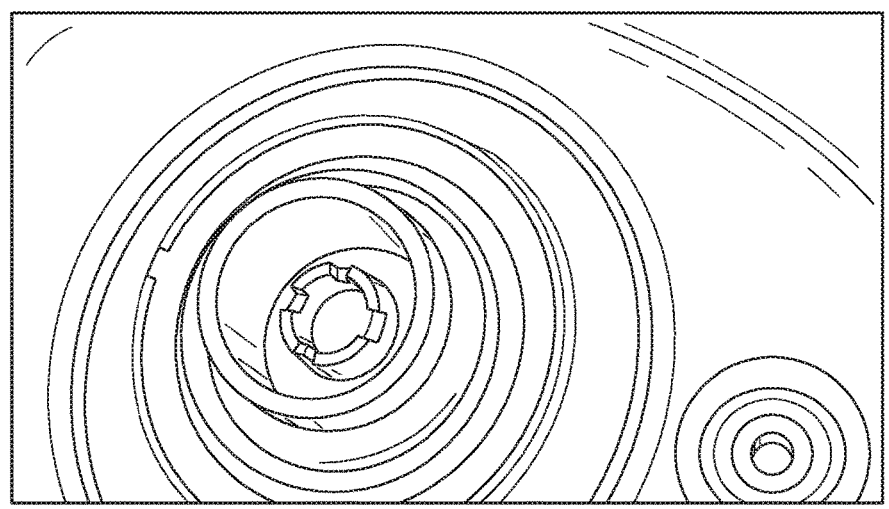

FIGS. 14A and 14B depict exemplary embodiments of the exemplary undersides of the exemplary vacuum interface and exemplary vacuum indicator, according to an exemplary embodiment.

Figure 15:
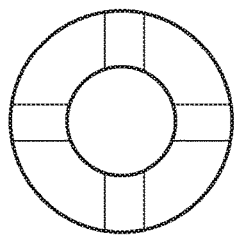
FIG. 15 illustrates an exemplary bottom view of the inner annular vacuum interface including a t-shaped notch through which an exemplary silicone vacuum plug may be inserted, and the notches may be adapted to enable evacuation of air from the container.

FIG. 15 illustrates an exemplary bottom view of the inner annular vacuum interface including a t-shaped notch through which an exemplary silicone vacuum plug may be inserted, and the notches may be adapted to enable evacuation of air from the container.

Figure 16:
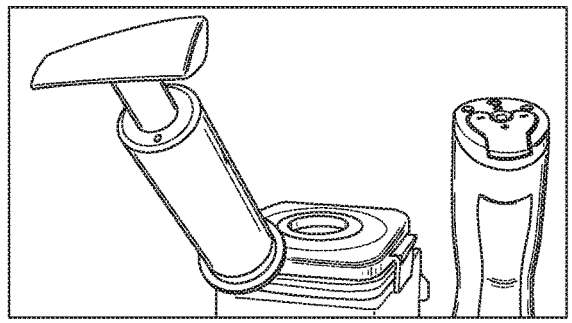
FIG. 16 illustrates an exemplary vacuum container system including an exemplary vacuum container; an exemplary manual vacuum pump, and/or an exemplary electric vacuum pump, according to an exemplary embodiment.

FIG. 16 illustrates an exemplary vacuum container system including an exemplary vacuum container, an exemplary manual vacuum pump, and/or an exemplary electric vacuum pump, according to an exemplary embodiment.

Figure 17A:
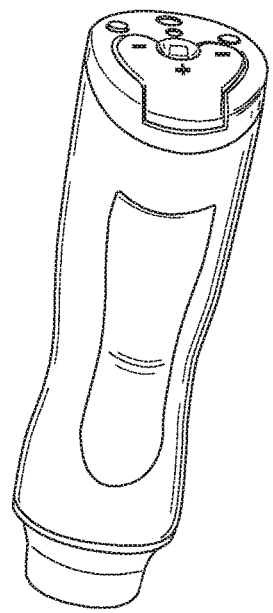
FIG. 17A illustrates an exemplary embodiment of an electric vacuum pump, according to an exemplary embodiment.

FIG. 17A illustrates an exemplary embodiment of an electric vacuum pump, according to an exemplary embodiment.

Figure 17B:
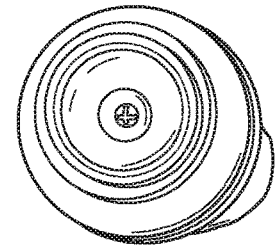
FIG. 17B illustrates an exemplary bottom isometric view of an exemplary electric vacuum pump, according to an exemplary embodiment.

FIG. 17B illustrates an exemplary bottom isometric view of an exemplary electric vacuum pump, according to an exemplary embodiment.

Figure 17C:
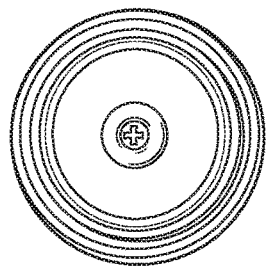
FIG. 17C illustrates another exemplary bottom view of another exemplary electric vacuum pump, according to an exemplary embodiment.

FIG. 17C illustrates another exemplary bottom view of another exemplary electric vacuum pump, according to an exemplary embodiment.

Figure 17D:
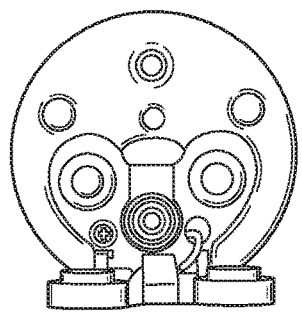
FIG. 17D depicts an exemplary embodiment of a top view of an exemplary electric pump including exemplary buttons and cavities for receiving exemplary batteries, and an exemplary battery cavity cover, according to an exemplary embodiment.

FIG. 17D depicts an exemplary embodiment of a top view of an exemplary electric pump including exemplary buttons and cavities for receiving exemplary batteries, and an exemplary battery cavity cover, according to an exemplary embodiment.

Figure 17E:
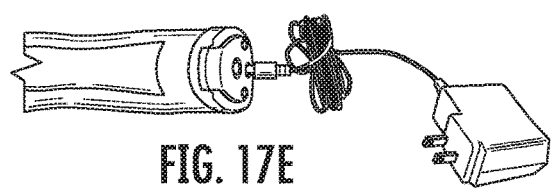
FIG. 17E depicts an exemplary alternating current (AC) adapter as may be coupled to the exemplary electric pump for, e.g., but not limited to, powering; or recharging a battery pack, etc., according to an exemplary embodiment.

FIG. 17E depicts an exemplary alternating current (AC) adapter as may be coupled to the exemplary electric pump for, e.g., but not limited to, powering, or recharging a battery pack, etc., according to an exemplary embodiment.

FIG. 17F depicts an exemplary embodiment of a kit of various sized containers and an exemplary pump as may be sold in an exemplary kit including a plurality of rectangular and square containers, which according to an exemplary embodiment may be adapted for stacking, and may be shaped to take advantage of rectangular or square space in a refrigerator and/or for storage, according to an exemplary embodiment.

FIG. 17G depicts an exemplary pump according to an exemplary embodiment, which may be rechargeable in one exemplary embodiment, may accommodate an A/C adapter, may accommodate batteries, and/or may include one, or a plurality of operating power levels to provide one or more levels of suction power, according to various exemplary embodiments.

Figure 18E:
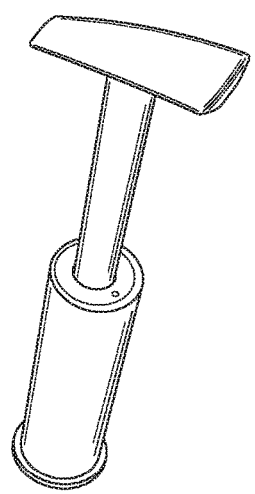
Figure 18F:
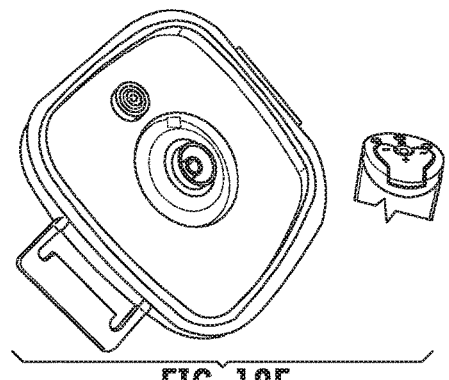
FIG. 18F illustrates an exemplary inner surface of an exemplary square shaped vacuum container including an exemplary bottom view of an exemplary vacuum indicator and exemplary vacuum interface, according to an exemplary embodiment.
Figure 18G:
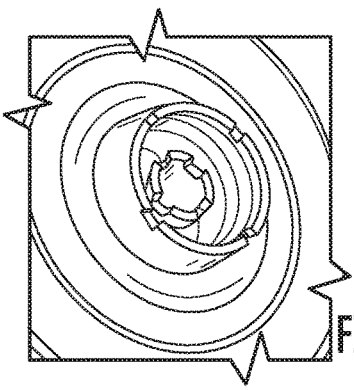
FIG. 18G illustrates an exemplary close up view of an exemplary inner surface of an exemplary square shaped vacuum container including an exemplary vacuum interface and notched opening through which an exemplary plug as shown in FIG. 13 may be inserted, according to an exemplary embodiment.

FIG. 18A depicts an exemplary front view of an exemplary manual vacuum pump, which may be adapted to extract air while pumping, and may in an exemplary embodiment be adapted to include an exemplary hole to improve air extraction as illustrated in FIG. 18G, according to an exemplary embodiment.

FIG. 18B depicts an exemplary isometric bottom and side view of an exemplary manual vacuum pump, which may be adapted to extract air while pumping, drawing air in through an exemplary plurality of holes on an exemplary inner surface of the pump, in an exemplary inner cavity, according to an exemplary embodiment.

FIG. 18C depicts an exemplary partial bottom view of an exemplary manual vacuum pump, which illustrates an exemplary four inlet holes for drawing in air when pumping air with the pump out of an exemplary vacuum container such as, e.g., but not limited to, the container of FIGS. 1-17 above, according to an exemplary embodiment.

FIGS. 18D and 18E depict an exemplary top view of exemplary manual pumps illustrating an exemplary air hole for allowing improved air release from the pump, when air is taken in through exemplary inlet holes from the exemplary pump, and then may be released through the exemplary one or more outlet holes, alternatively, air may be released around the handle, but performance of the pump may improve from use of the exemplary outlet hole, according to an exemplary embodiment. The pump may also include a syringe like internal plunger, not shown, as may be used to create the vacuum to draw out the air, according to one exemplary embodiment. According to another exemplary embodiment, other pumps as will be apparent to those skilled in the art may be used such as, e.g., but not limited to, one directional valves, etc.

FIG. 18F illustrates an exemplary inner surface of an exemplary square shaped vacuum container including an exemplary bottom view of an exemplary vacuum indicator and exemplary vacuum interface, according to an exemplary embodiment.

FIG. 18G illustrates an exemplary close up view of an exemplary inner surface of an exemplary square shaped vacuum container including an exemplary vacuum interface and notched opening through which an exemplary plug as shown in FIG. 13 may be inserted, according to an exemplary embodiment.

Figure 18H:
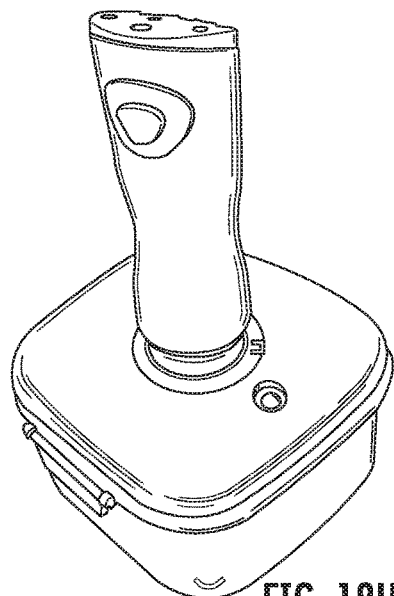
FIG. 18H illustrates an exemplary electrical pump including an exemplary push button as may be used to activate the pump, the pump coupled to an exemplary vacuum interface of an exemplary container, and as illustrated, the vacuum indicator indicates that the container is not yet sufficiently evacuated and remains in a non-vacuum state.

FIG. 18H illustrates an exemplary electrical pump including an exemplary push button as may be used to activate the pump, the pump coupled to an exemplary vacuum interface of an exemplary container, and as illustrated, the vacuum indicator indicates that the container is not yet sufficiently evacuated and remains in a non-vacuum state.

Figure 18I:
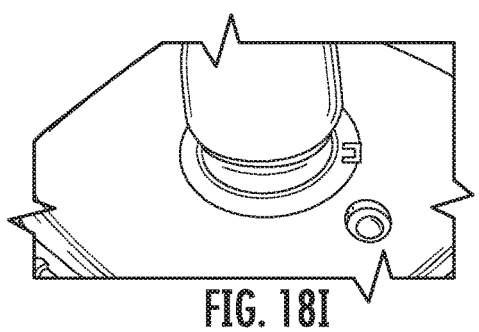
FIG. 18I illustrates an exemplary electrical pump coupled to an exemplary vacuum interface of an exemplary container as may be used to activate the pump, and as illustrated, the vacuum indicator indicates that the container has now been sufficiently evacuated of air to be in a vacuum state.

FIG. 18I illustrates an exemplary electrical pump coupled to an exemplary vacuum interface of an exemplary container as may be used to activate the pump, and as illustrated, the vacuum indicator indicates that the container has now been sufficiently evacuated of air to be in a vacuum state.

Figure 18J:
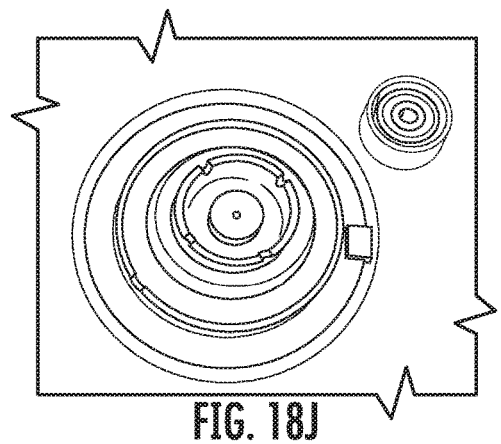
FIG. 18J illustrates the exemplary plug of FIG. 13, inserted in an exemplary vacuum interface of FIG. 18G, according to an exemplary embodiment.

FIG. 18J illustrates the exemplary plug of FIG. 13, inserted in an exemplary vacuum interface of FIG. 18I, according to an exemplary embodiment.

FIGS. 19A, 19B, 19C, 19D, 19E and 19F illustrate exemplary isometric views of an exemplary inner surface of an exemplary rectangular container, adapted to receive an exemplary removable, exemplary multiple-part, exemplary divider/separator members as illustrated in FIG. 19K, as may be used to create two or more separate areas within the exemplary vacuum container, including in an exemplary embodiment a reversible half length member and an exemplary width long divider member adapted to receive the half length divider member on one side as illustrated in 19A and B, and as removed in 19B and 19C, may be reinserted as shown in 19F, or the inner width member may be removed as illustrated in 19D to have a full container as illustrated in FIG. 19E which illustrates also exemplary ribs in the sides of both the long and short sides to receive the exemplary removable divider members, according to an exemplary embodiment.

FIG. 19G illustrates an exemplary top view of an exemplary lid illustrating exemplary four latches adapted to be coupled to one or more rims or protrusions of a rim of an exemplary vacuum container bottom as illustrated in FIGS. 19H (shallow depth) and 19I (deep depth) according to an exemplary embodiment.

FIG. 19J illustrates an exemplary nonremovable divider in an exemplary container, according to an exemplary embodiment.

FIG. 19K illustrates an exemplary two part divider removed from a container illustrating a t-shaped bottom cross section for providing rigidity and to support the divider members, and for interlocking into the ribbed protrusions in the exemplary inner edge of the contain as shown in FIG. 19L according to an exemplary embodiment.

FIG. 19L illustrates an exemplary bottom view of an exemplary vacuum container illustrating exemplary feet and an exemplary circular indentation to receive a rounded lid while stacking and an exemplary annular protrusion of sufficient depth to permit securing when stacking and placed in a respective annual cavity surrounding part of an exemplary lid's vacuum interface as shown, e.g., in the top view of FIG. 19G, to secure to one another stacked containers in evacuated vacuum state, a respective pair of such containers, according to an exemplary embodiment.

Figure 20:
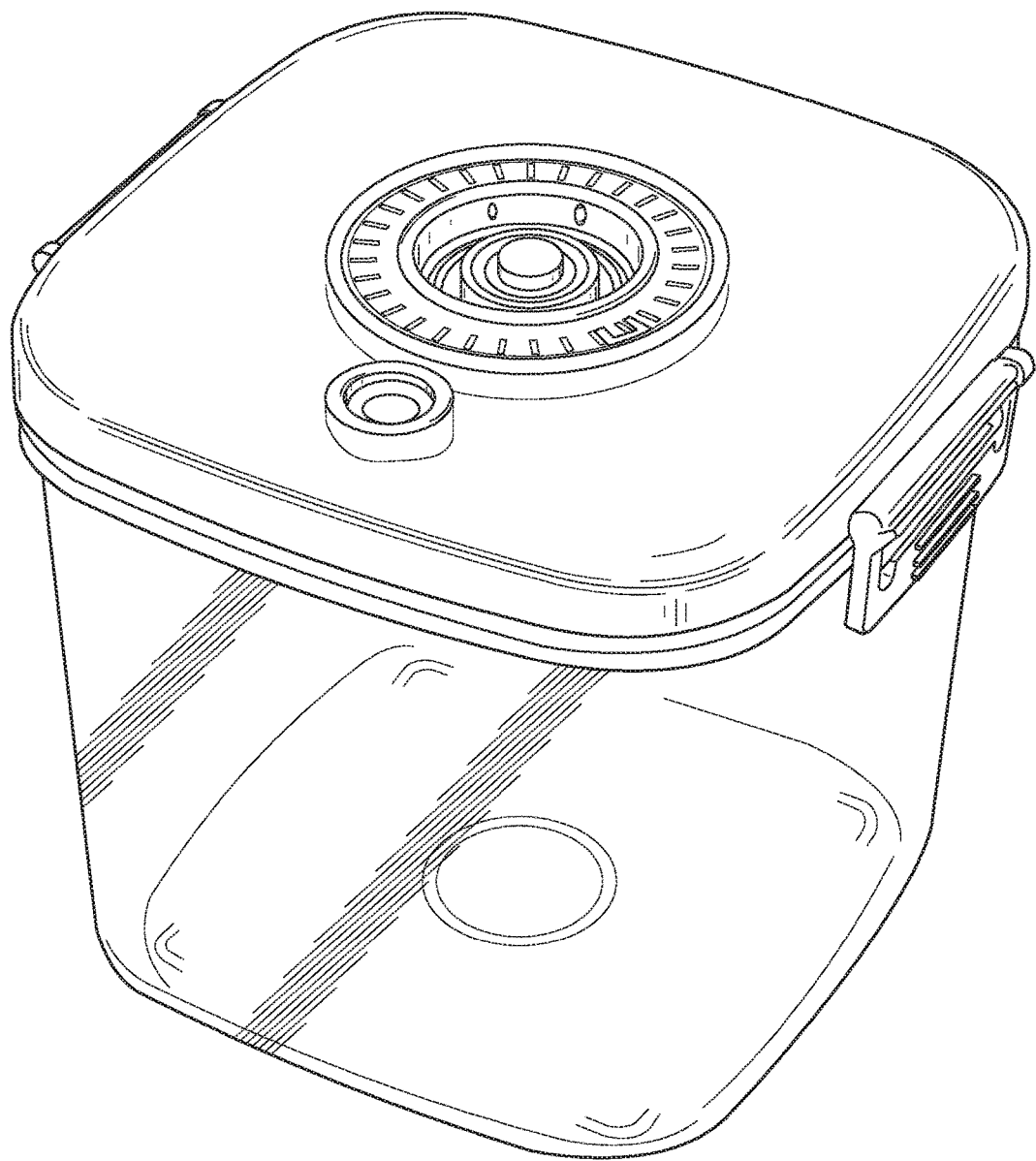
FIG. 20 depicts an exemplary rounded square vacuum container according to an exemplary embodiment, the exemplary container illustrated having an exemplary lid with exemplary two latches adapted to be coupled to an outer edge of a base, an exemplary annular dial with day indicator adapted to be usable to track age of container contents, a clear transparent plastic bottom which may be adapted for stacking, and the exemplary lid as illustrated includes an exemplary teal colored partially convex rounded lid with circular vacuum interface including an exemplary inner structure and an exemplary silicone rubber plug, exemplary vacuum indicator, and vacuum release, with exemplary multiple concentric surfaces including an exemplary annular concave slot for receiving an exemplary convex annular protrusion from the bottom of another such container for stacking, as shown, and as also described further with reference to FIG. 19L, according to an exemplary embodiment.

FIG. 20 depicts an exemplary rounded square vacuum container according to an exemplary embodiment, the exemplary container illustrated having an exemplary lid with exemplary two latches adapted to be coupled to an outer edge of a base, an exemplary annular dial with day indicator adapted to be usable to track age of container contents, a clear transparent plastic bottom which may be adapted for stacking, and the exemplary lid as illustrated includes an exemplary teal colored partially convex rounded lid with circular vacuum interface including an exemplary inner structure and an exemplary silicone rubber plug, exemplary vacuum indicator, and vacuum release, with exemplary multiple concentric surfaces including an exemplary annular concave slot for receiving an exemplary convex annular protrusion from the bottom of another such container for stacking, as shown, and as also described further with reference to FIG. 19L, according to an exemplary embodiment.

Figure 21:
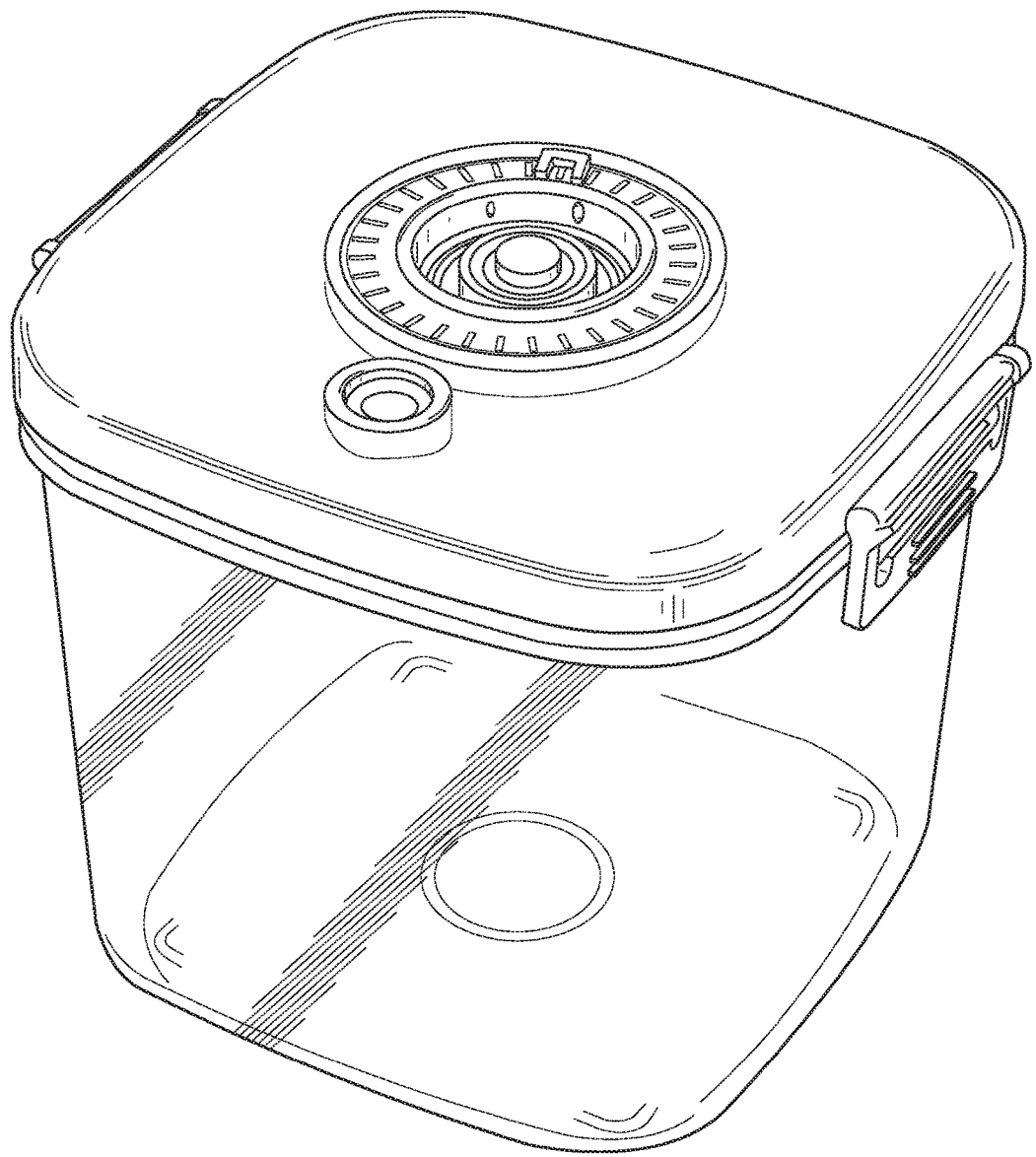
FIG. 21 illustrates another exemplary rounded square vacuum container similar to that shown in FIG. 1, of exemplary slightly shallower depth, according to an exemplary embodiment.

FIG. 21 illustrates another exemplary rounded square vacuum container similar to that shown in FIG. 1, of exemplary slightly shallower depth, according to an exemplary embodiment.

Figure 22:
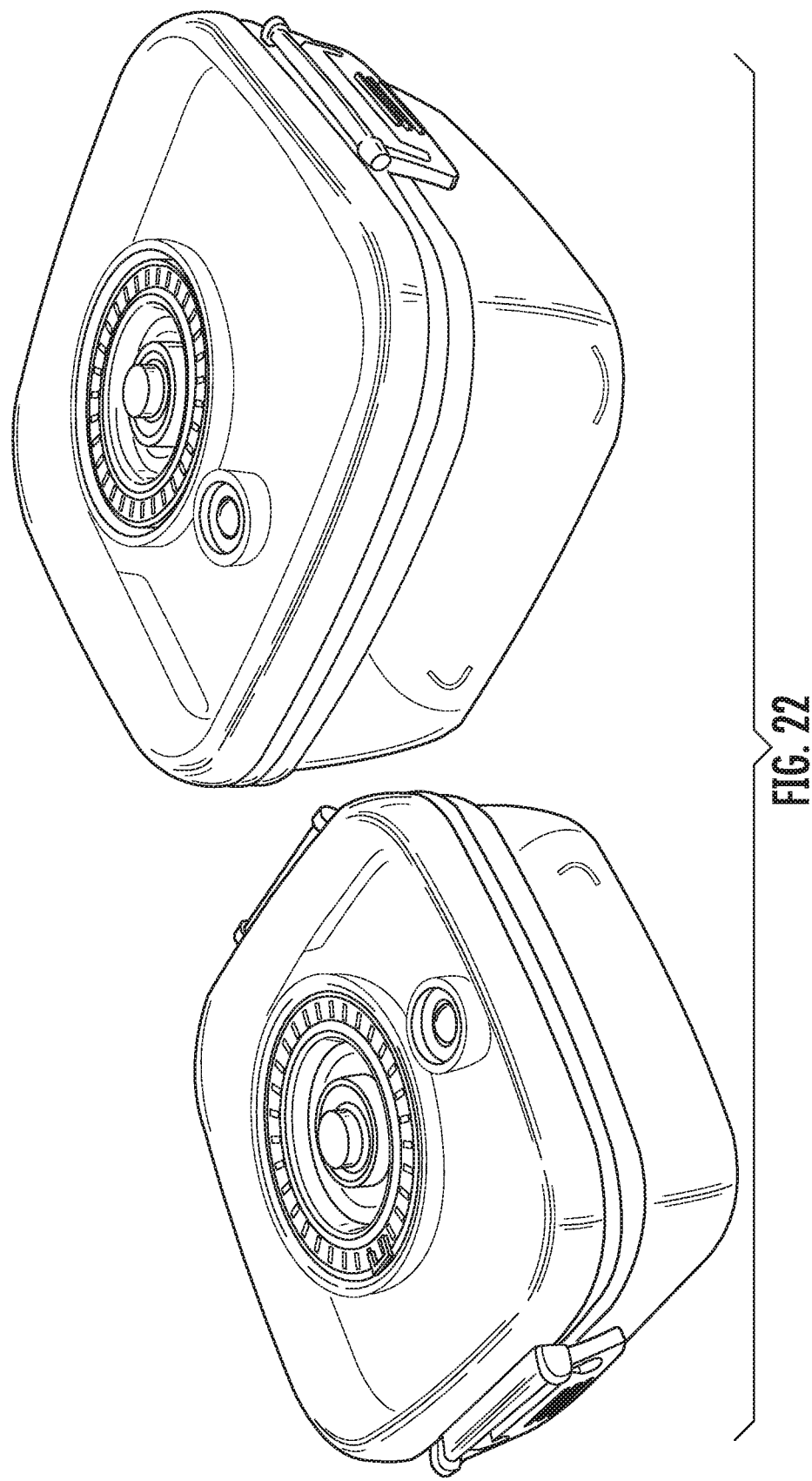
FIG. 22 illustrates additional exemplary rounded square vacuum containers, each having exemplary 2 latches, and including of varying size, according to an exemplary embodiment, which in various exemplary embodiments may be adapted to be stacked compatibly with the containers of FIGS. 1, 2, 20, and 21, according to an exemplary embodiment.

FIG. 22 illustrates additional exemplary rounded square vacuum containers, each having exemplary 2 latches, and including of varying size, according to an exemplary embodiment, which in various exemplary embodiments may be adapted to be stacked compatibly with the containers of FIGS. 1, 2, 20, and 21, according to an exemplary embodiment.

Figure 23:
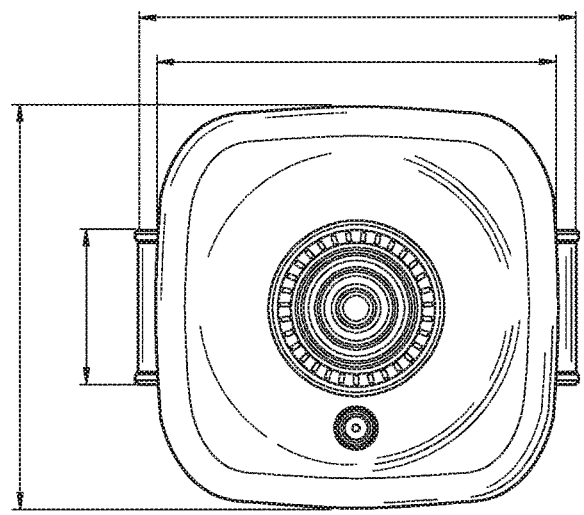
FIG. 23 depicts an exemplary top orthogonal view of the exemplary rounded rectangular vacuum container as depicted in FIG. 20 above, including exemplary, but non-limiting dimensions, according to an exemplary embodiment.

FIG. 23 depicts an exemplary top orthogonal view of the exemplary rounded rectangular vacuum container as depicted in FIG. 20 above, including exemplary, but nonlimiting dimensions, according to an exemplary embodiment.

Figures 24, 25:
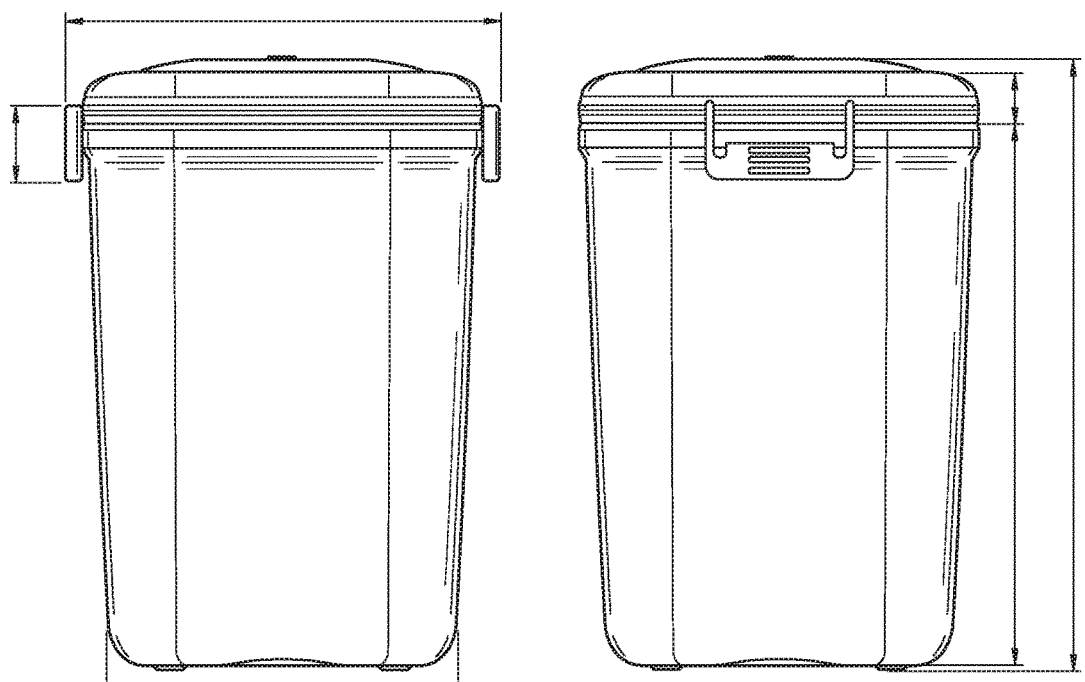
FIG. 24 depicts an exemplary front orthogonal view of the exemplary rounded rectangular vacuum container as depicted in FIG. 20 above, including exemplary, but non-limiting dimensions, according to an exemplary embodiment. According to another exemplary embodiment, the base may include an annular protrusion (not shown, but illustrated in FIG. 19L) adapted for stacking, according to an exemplary embodiment.
FIG. 25 depicts an exemplary side orthogonal view of the exemplary rounded rectangular vacuum container as depicted in FIG. 20 above, including exemplary, but non-limiting dimensions, according to an exemplary embodiment. According to another exemplary embodiment, the base may include an annular protrusion (not shown, but illustrated in FIG. 19L) adapted for stacking, according to an exemplary embodiment.

FIG. 24 depicts an exemplary front orthogonal view of the exemplary rounded rectangular vacuum container as depicted in FIG. 20 above, including exemplary, but nonlimiting dimensions, according to an exemplary embodiment. According to another exemplary embodiment, the base may include an annular protrusion (not shown, but illustrated in FIG. 19L) adapted for stacking, according to an exemplary embodiment.

FIG. 25 depicts an exemplary side orthogonal view of the exemplary rounded rectangular vacuum container as depicted in FIG. 20 above, including exemplary, but nonlimiting dimensions, according to an exemplary embodiment. According to another exemplary embodiment, the base may include an annular protrusion (not shown, but illustrated in FIG. 19L) adapted for stacking, according to an exemplary embodiment.

Figure 26:
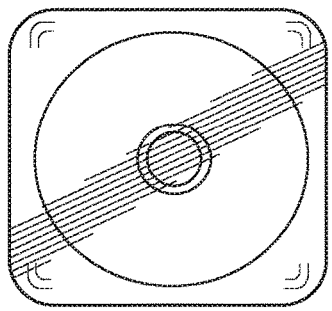
FIG. 26 illustrates an exemplary bottom view of an exemplary square vacuum container, according to an exemplary embodiment.

FIG. 26 illustrates an exemplary bottom view of an exemplary square vacuum container, according to an exemplary embodiment.

Figure 27A:
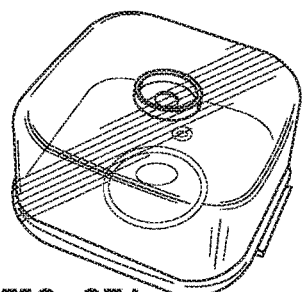
FIGS. 27A and 27B illustrate an exemplary lower surface of an exemplary square container and illustrate the annular stacking protrusion as may be used to stack the bottom of one container in an annular cavity as illustrated in FIG. 28, to permit stacking as illustrated in FIG. 29 whether in vacuum or non vacuum state, including a sufficient depth to the protrusion of FIGS. 27A and 27B of the protrusion to permit securing the upper container to the lower container even when evacuated in a vacuum state and the lid has been pulled in from vacuum pressure.
Figure 27B:
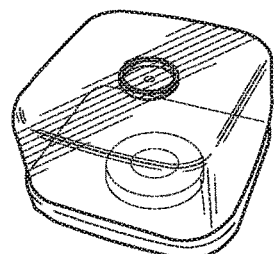
Figure 27C:
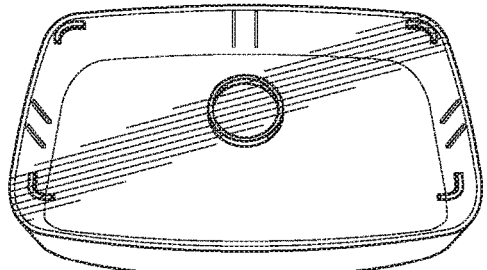
FIG. 27C illustrates an exemplary rectangular container having a large circular indentation.
Figure 28:
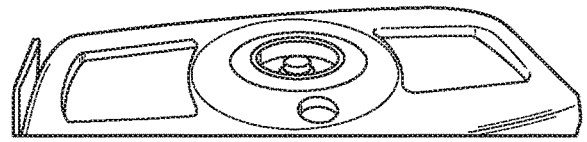
FIG. 28 illustrates an exemplary rectangular container having an annular cavity in the lid for stacking.
Figure 29:
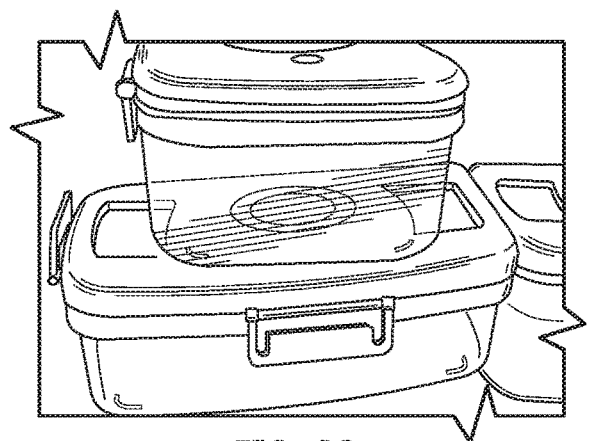
FIG. 29 illustrates a square container stacked on a rectangular container.

FIGS. 27A and 27B illustrate an exemplary lower surface of an exemplary square container and illustrate the annular stacking protrusion as may be used to stack the bottom of one container in an annular cavity as illustrated in FIG. 28, to permit stacking as illustrated in FIG. 29 whether in vacuum or non vacuum state, including a sufficient depth to the protrusion of FIGS. 27A and 27B of the protrusion to permit securing the upper container to the lower container even when evacuated in a vacuum state and the lid has been pulled in from vacuum pressure. FIGS. 27A and 27B also illustrate a circular indentation in the bottom of the container (see circular light reflection on FIG. 27B, and outer circle of FIG. 26), the large circular indentation is also shown on an exemplary rectangular container in FIG. 27C, as well as FIG. 12B, according to an exemplary embodiment.

Figure 30:
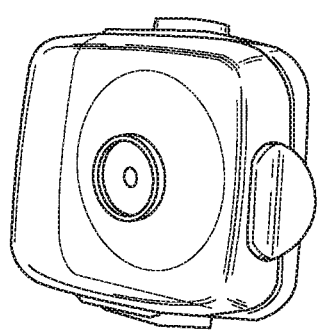
FIG. 30 illustrates an exemplary deep ring shaped protrusion made sufficiently long to securely be placed into the inner ring cavity of a given vacuum contain as shown in FIG. 31, according to an exemplary embodiment.
Figure 31:
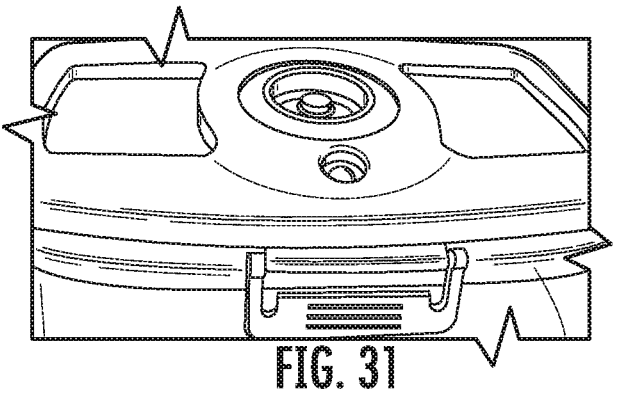

FIG. 30 illustrates an exemplary deep ring shaped protrusion made sufficiently long to securely be placed into the inner ring cavity of a given vacuum contain as shown in FIG. 31, according to an exemplary embodiment.

Figure 32:
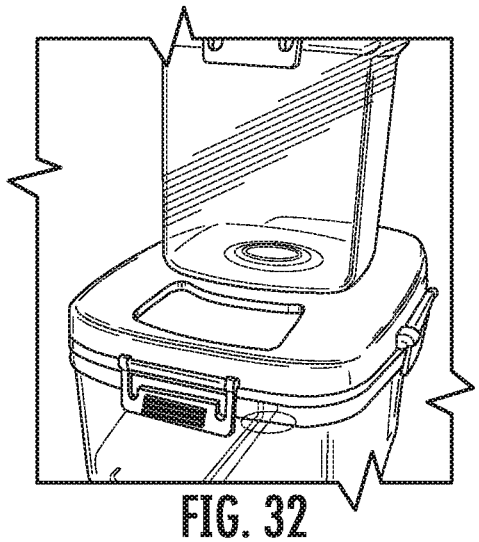
FIG. 32 illustrates exemplary combinations of stacking smaller square containers on larger square containers, and as shown in FIG. 29 above, square containers may also be stacked on a rectangular container, according to an exemplary embodiment.

FIG. 32 illustrates exemplary combinations of stacking smaller square containers on larger square containers, and as shown in FIG. 29 above, square containers may also be stacked on a rectangular container, according to an exemplary embodiment.

Figure 33:
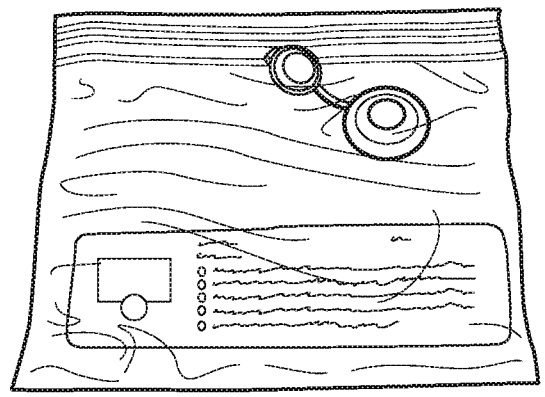
FIG. 33 illustrates an exemplary flavor locker vacuum bag, according to an exemplary embodiment.

FIG. 33 illustrates an exemplary flavor locker vacuum bag, according to an exemplary embodiment.

Figure 35:
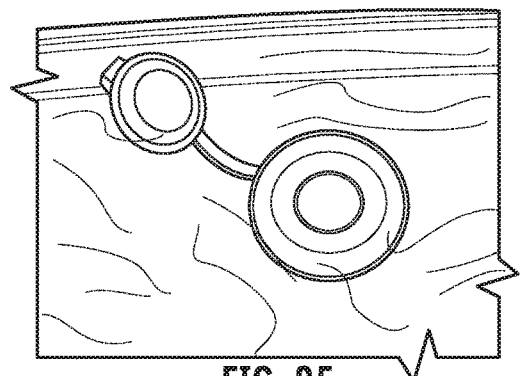
FIG. 35 illustrates an exemplary flavor locker vacuum bag including an exemplary vacuum interface of the exemplary hag, according to an exemplary embodiment.

FIG. 35 illustrates an exemplary flavor locker vacuum bag including an exemplary vacuum interface of the exemplary bag, according to an exemplary embodiment.

Figure 36:
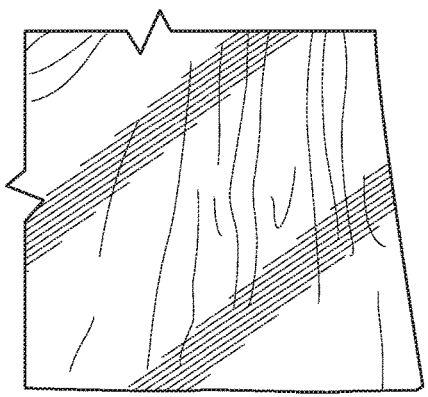
FIG. 36 illustrates an exemplary extra bonding at the edges of an exemplary interlocking bag interface, which may include one or more zipping or other locking tongue and groove interlocking openings.

FIG. 36 illustrates an exemplary extra bonding at the edges of an exemplary interlocking bag interface, which may include one or more zipping or other locking tongue and groove interlocking openings.

Figure 37:
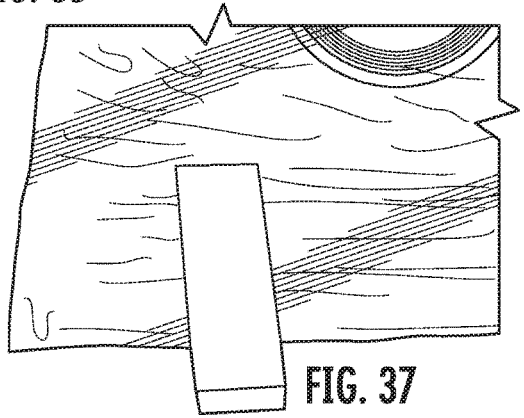
FIGS. 37 and 38 illustrate an exemplary removable tool that may be used to press and close the exemplary interlocking opening of the bag. Advantageously by being removable, one of the exemplary closure tools illustrated in FIG. 38 may be used with multiple bags to decrease the cost of a bag by not needing to include a tool with each hag.
Figure 38:

FIGS. 37 and 38 illustrate an exemplary removable tool that may be used to press and close the exemplary interlocking opening of the bag. Advantageously by being removable, one of the exemplary closure tools illustrated in FIG. 38 may be used with multiple bags to decrease the cost of a bag by not needing to include a tool with each bag.

Figure 39:
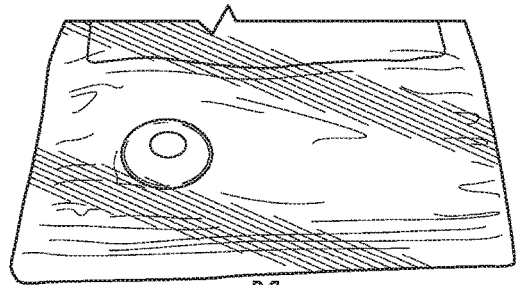
FIG. 39 illustrates an exemplary flavor locker vacuum bag; along with an exemplary removable closure tool, according to an exemplary embodiment.

FIG. 39 illustrates an exemplary flavor locker vacuum bag, along with an exemplary removable closure tool, according to an exemplary embodiment.

Figure 40:
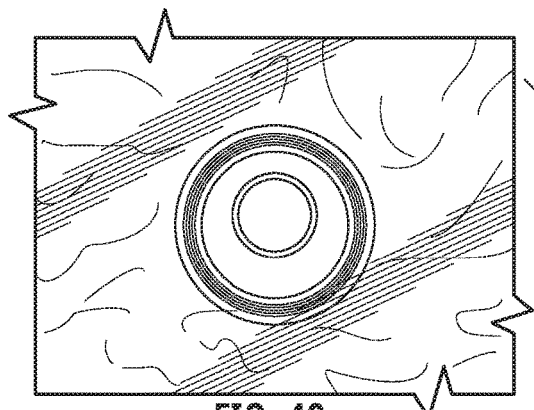
FIG. 40 illustrates an exemplary flavor locker vacuum interface with an exemplary circular snapping cap interface, according to an exemplary embodiment.

FIG. 40 illustrates an exemplary flavor locker vacuum interface with an exemplary circular snapping cap interface, according to an exemplary embodiment.

Figure 41:
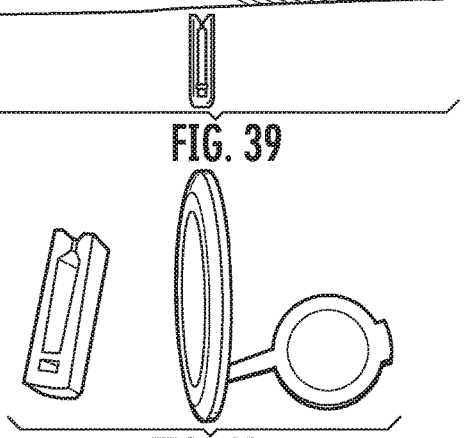
FIG. 41 illustrates an exemplary closure tool and an exemplary snapping cap for an exemplary vacuum bag, according to an exemplary embodiment.

FIG. 41 illustrates an exemplary closure tool and an exemplary snapping cap for an exemplary vacuum bag, according to an exemplary embodiment.

Figure 42:
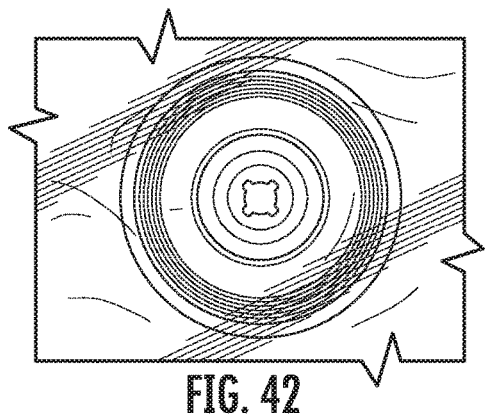
FIGS. 42 and 43 illustrate an exemplary flavor locker vacuum interface with the plug removed and the snapping cap removed of an exemplary circular snapping cap vacuum interface, according to an exemplary embodiment.
Figure 43:
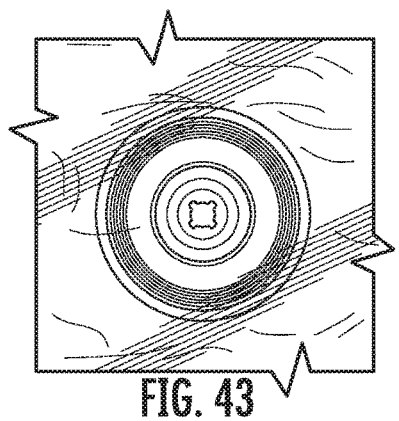

FIGS. 42 and 43 illustrate an exemplary flavor locker vacuum interface with the plug removed and the snapping cap removed of an exemplary circular snapping cap vacuum interface, according to an exemplary embodiment.

Figure 44:
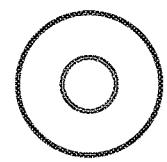
FIG. 44 illustrates an exemplary vacuum plug as may be placed in the opening illustrated in FIGS. 42 and 43, and may be of silicone rubber.

FIG. 44 illustrates an exemplary vacuum plug as may be placed in the opening illustrated in FIGS. 42 and 43, and may be of silicone rubber.

Figure 45:
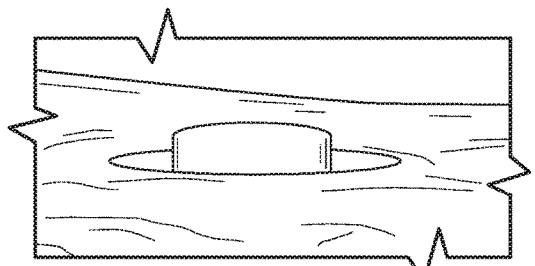
FIGS. 45 and 46 illustrate an exemplary side view of an exemplary flavor locker vacuum interface with an exemplary circular snapping cap interface and the snapping cap of FIG. 41 removed, according to an exemplary embodiment.
Figure 46:
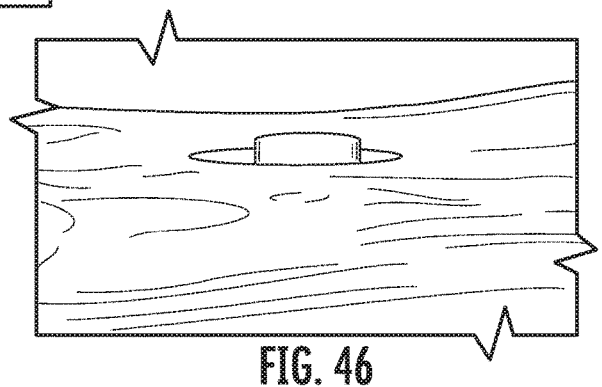

FIGS. 45 and 46 illustrate an exemplary side view of an exemplary flavor locker vacuum interface with an exemplary circular snapping cap interface and the snapping cap of FIG. 41 removed, according to an exemplary embodiment.

Figure 47:
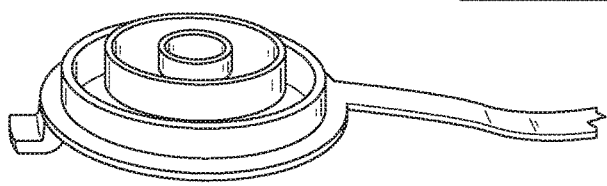
FIGS. 47 and 48 illustrate an exemplary circular snapping cap, according to an exemplary embodiment.
Figure 48:
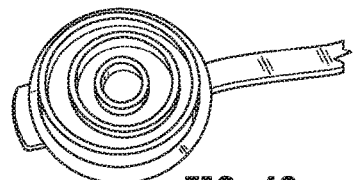

FIGS. 47 and 48 illustrate an exemplary circular snapping cap, according to an exemplary embodiment.

Figure 34A:
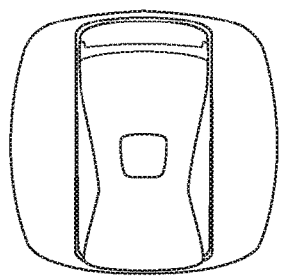
FIGS. 34A-34E illustrate exemplary, but nonlimiting dimensions of an exemplary, but nonlimiting salad chopper and/or slicer and/or dicer lid as illustrated in exemplary FIG. 34G, according to an exemplary embodiment.
Figure 34B:
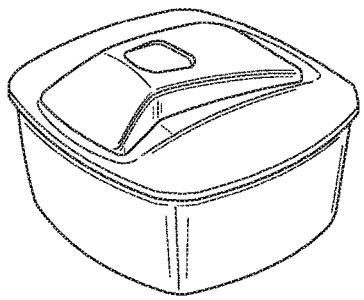
Figure 34C:
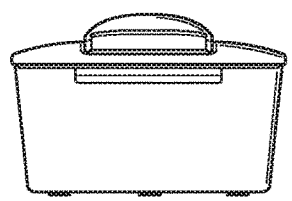
Figure 34D:
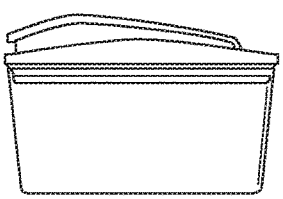
Figure 34E:
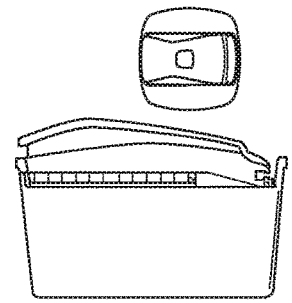
Figure 34F:
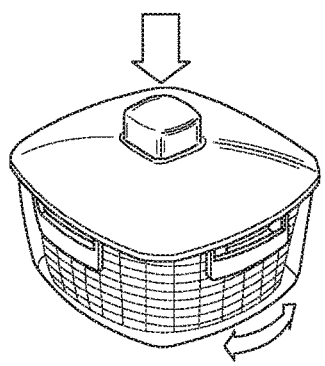
FIG. 34F illustrates an exemplary interchangeable salad spinner lid as may be used with an exemplary square or other rectangular vacuum container including an exemplary circular salad basket in an exemplary square container, allowing storage of the salad in the container in a refrigerator, and advantageously having a square shape for easing placement, and efficient space utilization, in the refrigerator or storage, according to an exemplary embodiment. According to an exemplary embodiment, the container may be adapted to permit stacking. Another exemplary embodiment of a salad spinner lid is illustrated in FIG. 49, according to an exemplary embodiment.
Figure 34G:
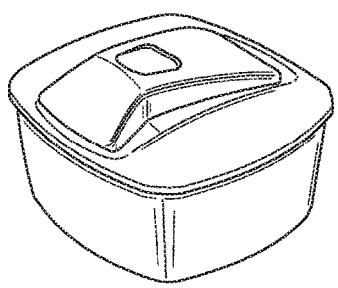
FIG. 34G illustrates an exemplary interchangeable salad slicer and/or dicer and/or chopper lid as may be used with an exemplary square or other rectangular vacuum container including an exemplary circular salad basket in an exemplary square container, allowing storage of the chopped salad in the container in a refrigerator, and advantageously having a square shape, interchangeable with the other lids for placing in the refrigerator or storage, according to an exemplary embodiment.

FIGS. 34A-34E illustrate exemplary, but nonlimiting dimensions of an exemplary, but nonlimiting salad chopper and/or slicer and/or dicer lid as illustrated in exemplary FIG. 34G, according to an exemplary embodiment.

FIG. 34F illustrates an exemplary interchangeable salad spinner lid as may be used with an exemplary square or other rectangular vacuum container including an exemplary circular salad basket in an exemplary square container, allowing storage of the salad in the container in a refrigerator, and advantageously having a square shape for placing in the refrigerator or storage, according to an exemplary embodiment. Another exemplary embodiment of a salad spinner lid is illustrated in FIG. 49, according to an exemplary embodiment.

FIG. 34G illustrates an exemplary interchangeable salad slicer and/or dicer and/or chopper lid as may be used with an exemplary square or other rectangular vacuum container including an exemplary circular salad basket in an exemplary square container, allowing storage of the chopped salad in the container in a refrigerator, and advantageously having a square shape, interchangeable with the other lids for placing in the refrigerator or storage, according to an exemplary embodiment.

Figure 34H:
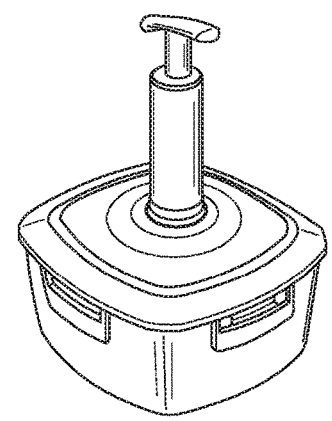
FIG. 34H illustrates an exemplary interchangeable vacuum contain lid as may be interchanged with the salad slicer and/or dicer and/or chopper lid of FIG. 34G and the salad spinner lid of FIG. 34F or 49, as may be used with an exemplary square or other rectangular vacuum container, according to an exemplary embodiment.
Figure 49:
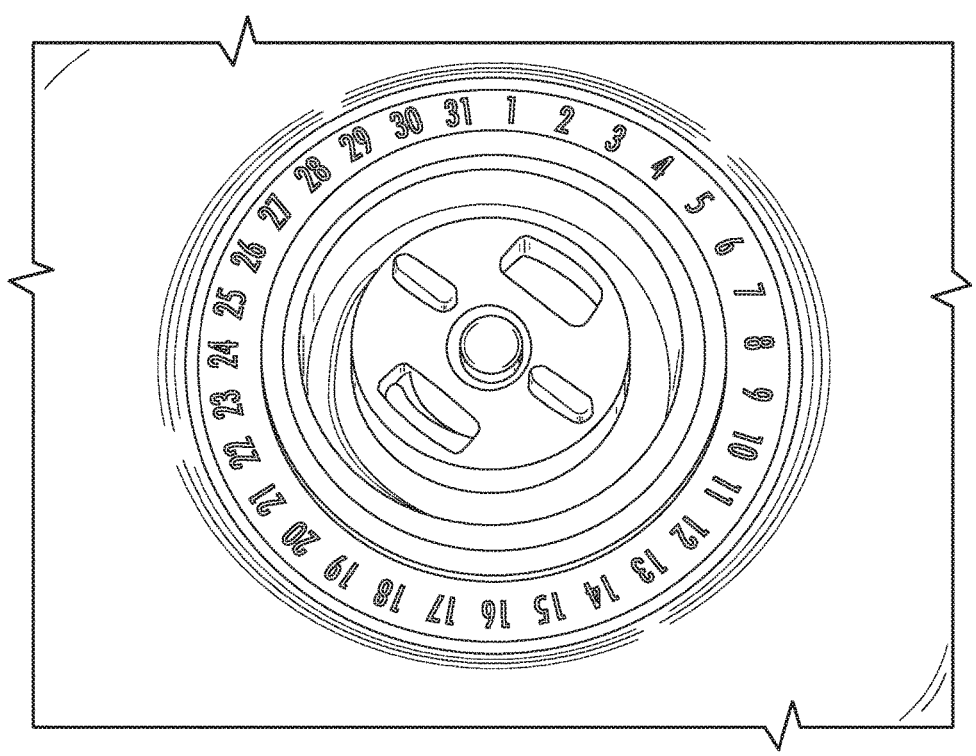
FIG. 49 including an exemplary spinner mechanism which may permit an exemplary initial winding of a handle and coupled spring clockwork, which, when the spring is allowed to unwind may be coupled by gears or other coupling to cause the basked to spin according to an exemplary embodiment. An exemplary hold may be provided as shown, for other exemplary uses such as to accommodate an exemplary brake, or to allow easily lifting the lid, etc., according to an exemplary embodiment.

FIG. 34H illustrates an exemplary interchangeable vacuum contain lid as may be interchanged with the salad slicer and/or dicer and/or chopper lid of FIG. 34G and the salad spinner lid of FIG. 34F or 49, as may be used with an exemplary square or other rectangular vacuum container, according to an exemplary embodiment.

FIG. 49 including an exemplary spinner mechanism which may permit an exemplary initial winding of a handle and coupled spring clockwork, which, when the spring is allowed to unwind may be coupled by gears or other coupling to cause the basked to spin according to an exemplary embodiment. An exemplary hold may be provided as shown, for other exemplary uses such as to accommodate an exemplary brake, or to allow easily lifting the lid, etc., according to an exemplary embodiment.

Figure 50:
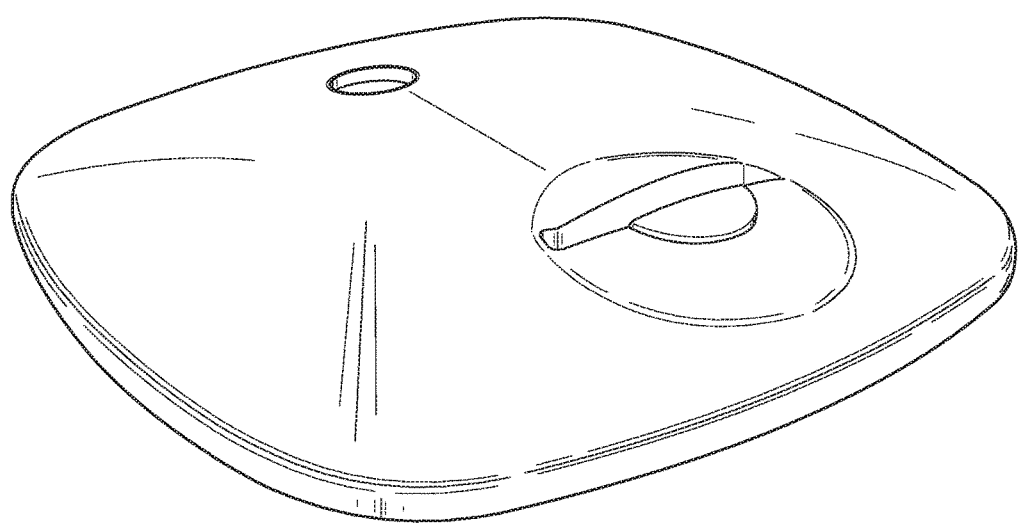
FIG. 50 sets forth an exemplary vacuum container cover with various exemplary features including an exemplary improved twist and lock cap that when selectably twisted in an exemplary clockwise manner by grasping exemplary protrusion/handles may releasably lock, and/or may be untwisted in an exemplary counter-clockwise manner by grasping the exemplary protrusion/handles to unlock and allow evacuating or vacuating the container by, e.g., pumping air out through one or more exemplary holes through the cap, or releasing the vacuum by depression of an exemplary button at a top of an exemplary improved silicone plug, which as shown in an exemplary embodiment may protrude through an opening in the cap, wherein when the cap is locked, the cap may prevent the vacuum from being released, and as shown; and, the container in one exemplary embodiment may further include an exemplary dial for tracking an age of exemplary contents, according to an exemplary embodiment.

FIG. 50 sets forth an exemplary vacuum container cover with various exemplary features including an exemplary improved twist and lock cap that when selectably twisted in an exemplary clockwise manner by grasping exemplary protrusion/handles may releasably lock, and/or may be untwisted in an exemplary counter-clockwise manner by grasping the exemplary protrusion/handles to unlock and allow evacuating or vacuating the container by, e.g., pumping air out through one or more exemplary holes through the cap, or releasing the vacuum by depression of an exemplary button at a top of an exemplary improved silicone plug, which as shown in an exemplary embodiment may protrude through an opening in the cap, wherein when the cap is locked, the cap may prevent the vacuum from being released, and as shown; and, the container in one exemplary embodiment may further include an exemplary dial for tracking an age of exemplary contents, according to an exemplary embodiment.

Figure 51:
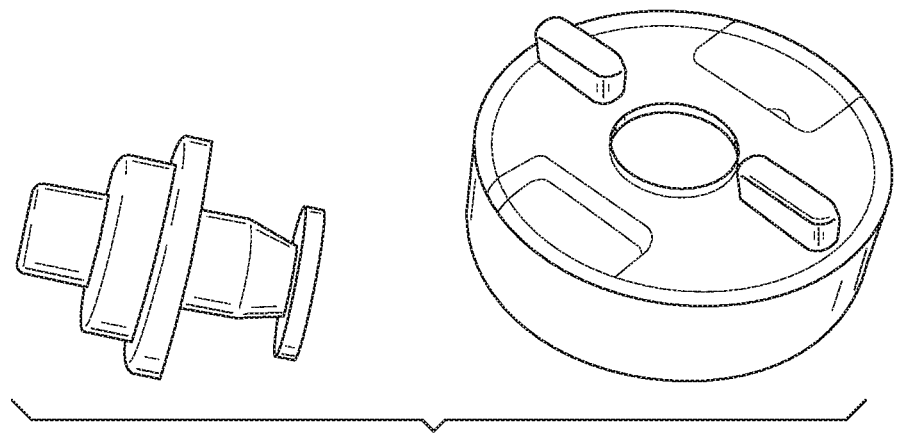
FIG. 51 sets forth an exemplary side view of a plug and an exemplary disconnected view of an exemplary twist and lock cap, according to an exemplary embodiment.
Figure 52:
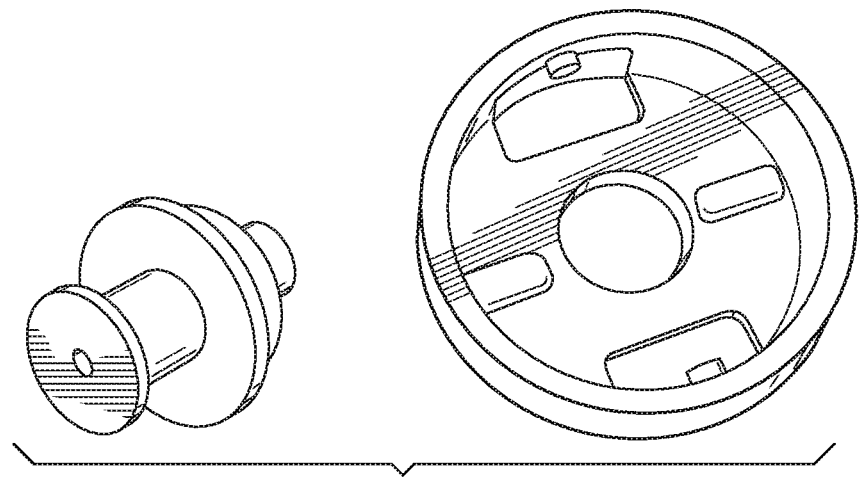
FIG. 52 sets forth another exemplary view of the exemplary plug and exemplary twist and lock cap of FIG. 51, according to an exemplary embodiment.

FIG. 51 sets forth an exemplary side view of a plug 5202 and an exemplary disconnected view of an exemplary twist and lock cap 5212, according to an exemplary embodiment.

Exemplary plug 5202, as illustrated may include an upper portion 5204, a central body portion 5206, a bottom portion 5208, and an exemplary handle portion 5210, according to an exemplary embodiment. In an exemplary embodiment the upper portion 5204 may include one or more exemplary circular cylindrical portions, the central body portion 5206 may include one or more generally cylindrical and conical portions, the bottom portion 5208 may include an exemplary cylindrical portion, which may be slightly larger in radius than the central body portion 5206 to assist in securing the plug in an opening in the container, and the exemplary handle portion 5210 may include, an exemplary cylindrical portion that may be adapted to fit through an exemplary opening in the cap 5212, to allow vacuum release when the exemplary handle portion is moved, according to an exemplary embodiment. In the exemplary embodiment as shown, the upper portion 5204 may include two substantially cylindrical, and/or rounded cylindrical, and/or conical portions, which may be larger in diameter than the exemplary central portion 5206 to secure the plug, in combination with the bottom portion 5208, on either side of the container opening, according to an exemplary embodiment. The plug in an exemplary embodiment may be constructed from silicone rubber. In an exemplary embodiment, plug 5202 may have a internal hollow opening, which may be a circular opening.

Exemplary twist and lock cap 5212 may include an exemplary one or more opening 5214, 5218 through which air may flow during vacuation and/or evacuation, an exemplary one or plurality of handles 5216, an exemplary opening 5218 through which the plug 5202 handle 5210 may fit through, and/or one or more locking member(s) 5220 (only one of a pair is visible in this exemplary view), and may in an exemplary embodiment be constructed of a firm resilient plastic material to be strong enough to remain resilient during numerous locking and unlocking manipulations by a user, according to an exemplary embodiment. The exemplary holes 5214, 5218 may allow air flow therethrough when the twist and lock cap 5212 is in an unlocked state, and may when in an exemplary locked state, resist air flow or release of the exemplary plug 5202, according to an exemplary embodiment. Each exemplary locking portion(s) 5220 may interlock with complementary member(s), and/or ridge(s), and/or threads and/or other locking members of the exemplary container cover/lid. The exemplary cap 5212 and plug 5202 are shown coupled to the complementary locking member(s) or rim of the container lid/cover as illustrated in FIG. 50.

FIG. 32 sets forth another exemplary view of the exemplary plug 5202 and exemplary twist and lock cap 5212 of FIG. 51, according to an exemplary embodiment, including an exemplary bottom portion 5208 view of exemplary plug 5202 including exemplary hollow opening 5221 in the exemplary bottom portion 5208, and an exemplary pair of exemplary locking portion(s) 5220 illustrated on an inner surface of the exemplary cap 5212, also illustrating an exemplary wall portion of the cap 5212 including an exemplary thickness, and an exemplary bottom view of exemplary holes 5214, 5218.

Figure 53:
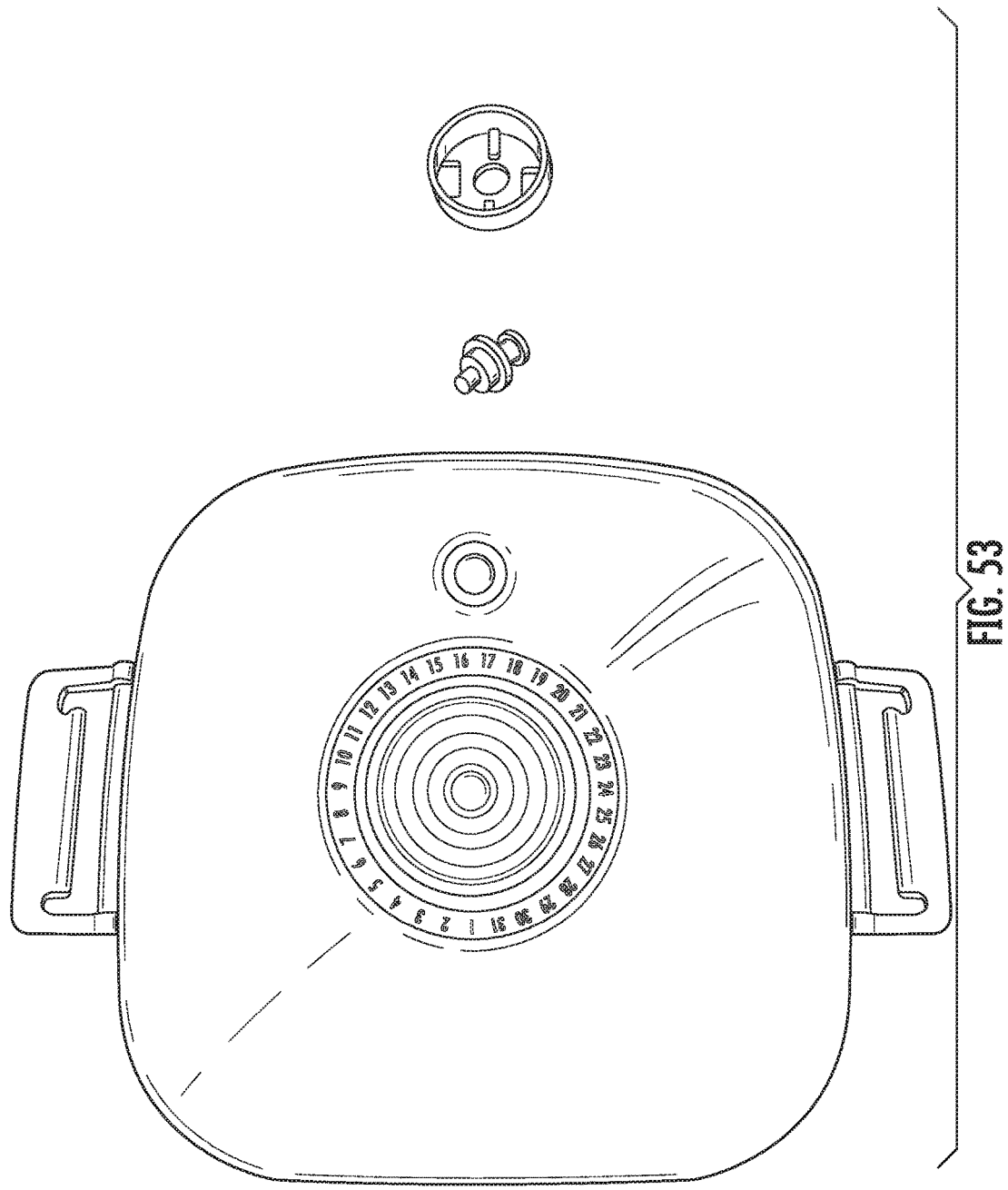
FIG. 53 sets forth another exemplary top view of an exemplary kit of an exemplary rounded square container cover, an exemplary silicone plug, and an exemplary twist and lock cap, according to an exemplary embodiment.

FIG. 53 sets forth another exemplary top view of an exemplary kit of an exemplary rounded square container cover including exemplary interlocking complementary member(s), and/or ridge(s), and/or threads and/or other locking members, an exemplary silicone plug 5202, and an exemplary twist and lock cap 5212, in an uncoupled illustration, according to an exemplary embodiment.

Figure 54:
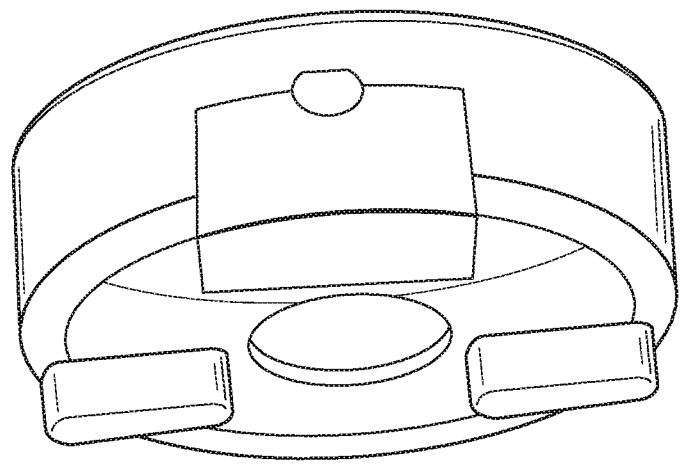
FIG. 54 sets forth another exemplary view of an exemplary twist and lock cap illustrating exemplary handles, exemplary inner protrusions for coupling the cap to an exemplary rim of a receiving portion of an exemplary container cover, and illustrating one or more exemplary openings in the cap permitting air to evacuate when unlocked, and allowing pressing the silicone plug, when the cap is unlocked, according to an exemplary embodiment.

FIG. 54 sets forth another exemplary view of an exemplary twist and lock cap 5212 illustrating exemplary handles 5216, exemplary inner protrusions (locking portion(s) 5220) for coupling the cap 5212 to an exemplary rim of a receiving portion of an exemplary container cover (as illustrated in FIG. 53), and illustrating one or more exemplary openings 5214, 5218 in the cap 5212 permitting air to evacuate when unlocked, and allowing pressing the silicone plug on its exemplary handle button 5210 to release such vacuum, when the cap 5212 is in an unlocked position, or preventing air release when cap 5212 is in a locked position, according to an exemplary embodiment. FIG. 54 illustrates further a slotted opening (not labeled) below opening 5214 (notched out of the exemplary periphery of exemplary wall portion of an exemplary cap 5212), allowing and aiding in air flow movement about the exterior of plug 5202, according to an exemplary embodiment.

Figure 55:
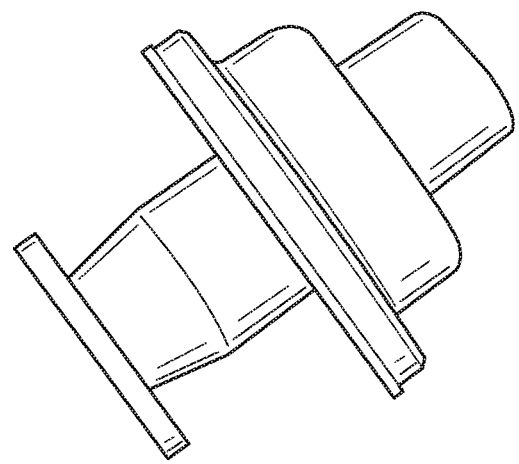
FIG. 55 sets forth another exemplary side view of an exemplary silicone plug as may be adapted to be received within an exemplary twist and lock cap, according to an exemplary embodiment.

FIG. 55 sets forth another exemplary side view of an exemplary silicone plug illustrating an exemplary side shape of an exemplary symmetric plug 5202 according to an exemplary embodiment, as may be adapted to be received within an exemplary twist and lock cap 5216 illustrated in FIG. 54, according to an exemplary embodiment.

According to an exemplary embodiment, the locking cap safety mechanism may be adapted to lock in vacuum packed vacuum in the flavor locker, preventing air from entering the chamber of the vacuum container. The silicone pressure maintaining plug may be released by a twisting and unlocking of the exemplary plastic cap. In an exemplary embodiment, the exemplary plastic cap may be turned in an exemplary clockwise direction to lock, in an exemplary 180 degree turn, and when so turned, according to an exemplary embodiment may crimp the silicone plug in place to prevent escape of the vacuum from the container. In an exemplary embodiment, the exemplary plastic cap may be turned in an exemplary counter clockwise direction to unlock, in an exemplary 180 degree turn, and when so turned, according to an exemplary embodiment may uncrimp the silicone plug to enable manual release by, e.g., but not limited to, tilting of the exemplary silicon plug, and/or releasing by depression of an exemplary optional button, to allow the vacuum pressure to escape from the container.

The process of using the cap may include, first pumping all the air out, using, e.g., a manual or electric suction pump, then locking the cap so the silicone plug will not release air, then when the contents of the container are to be accessed, unlocking the cap, allowing the silicone plug to allow air movement out of the container, when pressing down the exemplary button in the center of the opening of the cap may allow the silicone plug to release the vacuum, and then air may return into the vacuum chamber around the plug and through the hole in the container lid in which the plug was inserted, and through one or more holes in the locking cap. The locking cap may include screw threads and/or other mechanisms to crimp the silicone plug in an exemplary locked position, preventing air vacuum from escaping. The silicone plug may be locked or coupled to the lid by the locking cap. Advantageously, the plug will not be lost down a drain or otherwise be separated from the container lid, avoiding unintended loss of the small silicone plug during cleaning or other use and/or storage of the lid. The use of the locking cap prevents or avoids accidental vacuum release by accidental hitting of the silicone plug while stowing or otherwise moving or placing the vacuum container. Advantageously, using the locking cap, the vacuum state of the vacuum container may be maintained for a longer period of time.

In an exemplary embodiment, certain foodstuffs, such as, e.g., but not limited to, ice cream may be found to have an advantageous improved flavor from evacuating air from the container, according to an exemplary embodiment. In an exemplary embodiment, various alternative vacuum locking stoppers with plugs may be adapted for additional purposes.

For example, an exemplary wine stopper for a wine or other liquid bottle may be provided, as illustrated in exemplary FIGS. 56-58, and 59-61 described further below, according to an exemplary embodiment.

Figure 56:
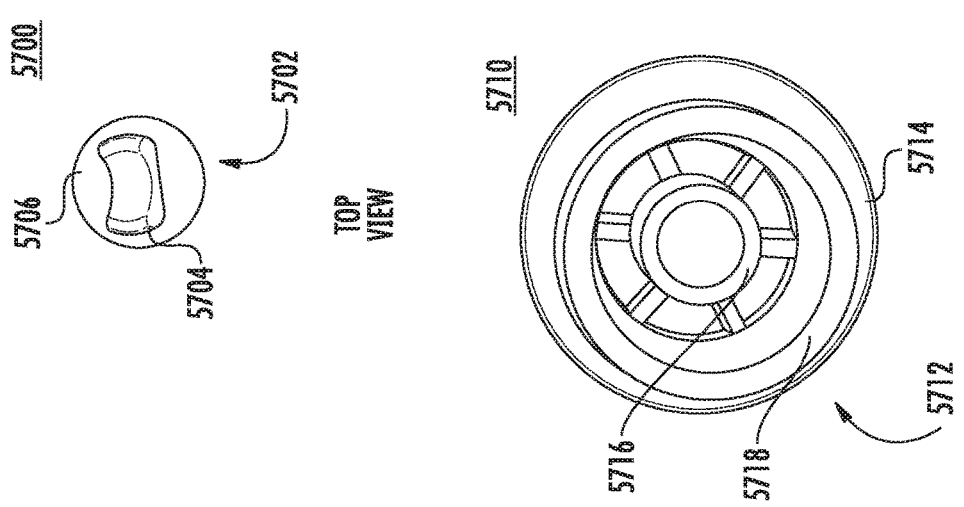
FIG. 56 depicts an exemplary top view of an exemplary vacuum wine stopper and an exemplary top view of exemplary plug, according to an exemplary embodiment, including a vacuum wine stopper of top view including an outer rim, a top ring, and an inner opening ring, according to an exemplary embodiment.

FIG. 56 depicts an exemplary top view 5710 of an exemplary vacuum wine stopper 5712 and an exemplary top view 5700 of exemplary plug 5702, according to an exemplary embodiment.

Plug 5700 may include an exemplary handle 5704 coupled to a substantially circular portion 5706, according to an exemplary embodiment. An isometric side view of the vacuum wine stopper appears below and is described with reference to FIG. 59, according to an exemplary embodiment.

Vacuum wine stopper 5712 of top view 5710 includes outer rim 5714, top ring 5718, and inner opening ring 5716, according to an exemplary embodiment.

Figure 57:
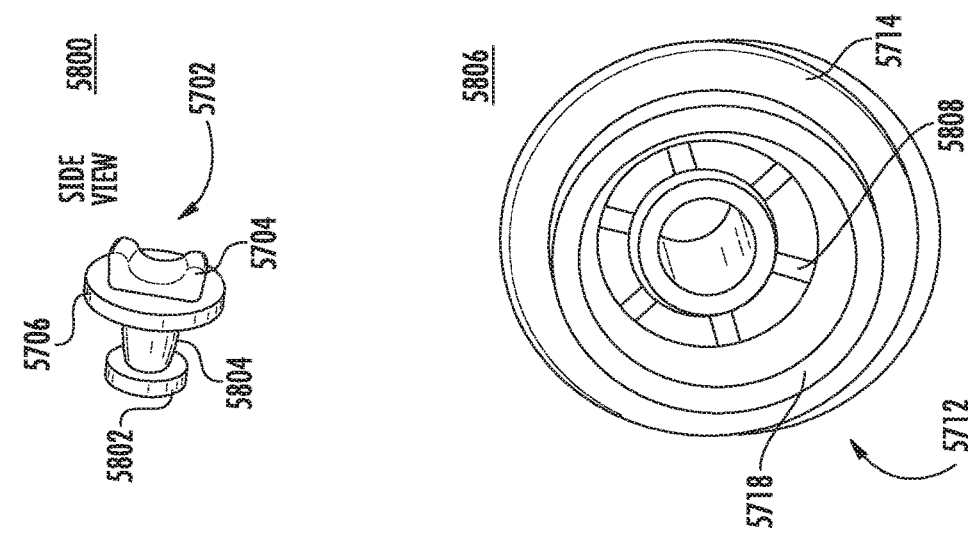
FIG. 57 depicts a side view of plug illustrating an exemplary central portion, which may be cylindrical and/or conical, and may coupled an exemplary bottom cylindrical disc portion on a bottom end, and another top view of the top cylindrical disc portion, according to an exemplary embodiment.

FIG. 57 depicts a side view 5800 of plug 5702 illustrating an exemplary central portion 5804, which may be cylindrical and/or conical, and may coupled an exemplary bottom cylindrical disc portion 5802 on a bottom end, and another top view of the top cylindrical disc portion 5706, according to an exemplary embodiment. Top handle button 5704 is shown permitting movement of the top of the plug 5702 when releasing vacuum, according to an exemplary embodiment. Plug 5702 may be placed in opening ring 5716 and may be used to plug the opening to create a vacuum, according to an exemplary embodiment. As depicted, several exemplary ribs 5808 may strengthen opening 5716 by placing ribs between ring 5716 and outer top ring 5718, according to an exemplary embodiment.

Figure 58:
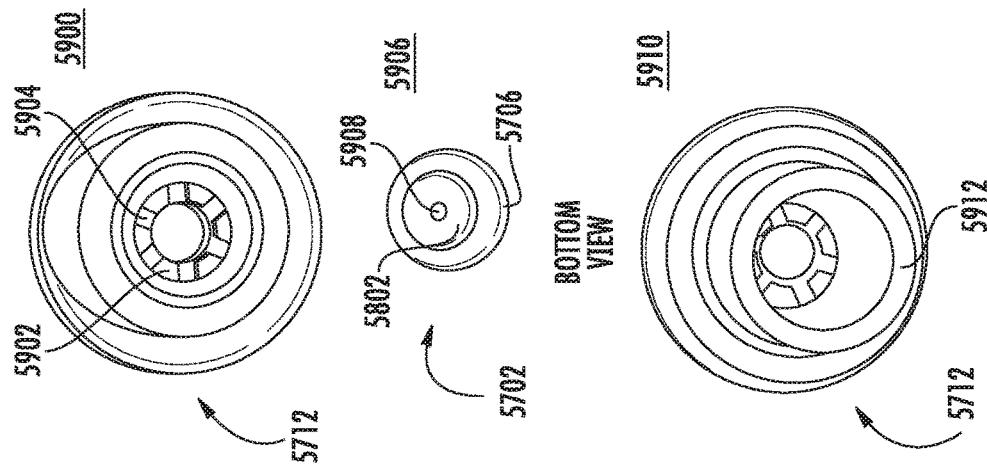
FIG. 58 depicts an exemplary set of bottom views, of the wine stopper, according to an exemplary embodiment.

FIG. 58 depicts an exemplar set of bottom views 5900, 5910 of the wine stopper 5712, according to an exemplary embodiment. FIG. 58 depicts bottom view 5910 showing the bottom portion 5912 of the stopper 5712 that gets inserted into the bottle, according to an exemplary embodiment. Bottom view 5900 depicts another bottom view of the stopper 5712, showing a plurality of raised portions 5902, alternating with a plurality of lower indentations or flat areas 5904, internally surrounding on the underside the hole formed by ring 5716 shown in FIG. 56, according to an exemplary embodiment. Also depicted in FIG. 58 is a bottom view 5906 of plug 5702 including top cylindrical portion 5706 and bottom portion 5802, with an exemplary opening 5908 illustrating that the plug may be hollow according to an exemplary embodiment.

Figure 59:
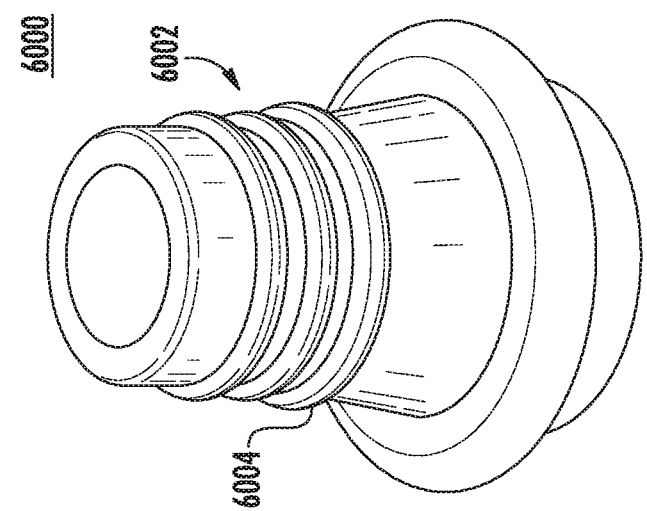
FIG. 59 depicts an exemplary isometric side view of a complete vacuum wine stopper with plug inserted combination stopper including one or more rib(s), for frictionally gripping an inner portion of a wine bottle (not shown), according to an exemplary embodiment.

FIG. 59 depicts an exemplary isometric side view 6000 of a complete vacuum wine stopper 5712 with plug 5702 inserted combination stopper 6002 including one or more rib(s) 6004, for frictionally gripping an inner portion of a wine bottle (not shown), according to an exemplary embodiment.

Figure 60:
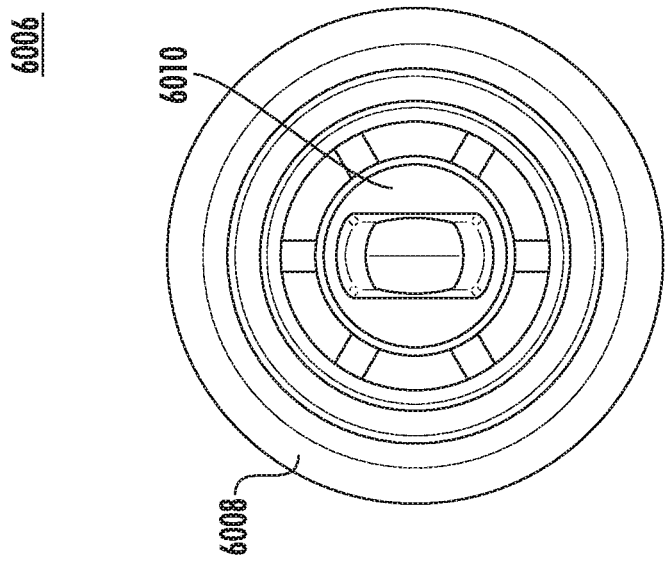
FIG. 60 depicts a top view of stopper with the plug inserted, according to an exemplary embodiment.

FIG. 60 depicts a top view 6006 of stopper 6002 with the plug 5702 inserted (the plug is labeled as 6010 in this figure), according to an exemplary embodiment.

Figure 61:
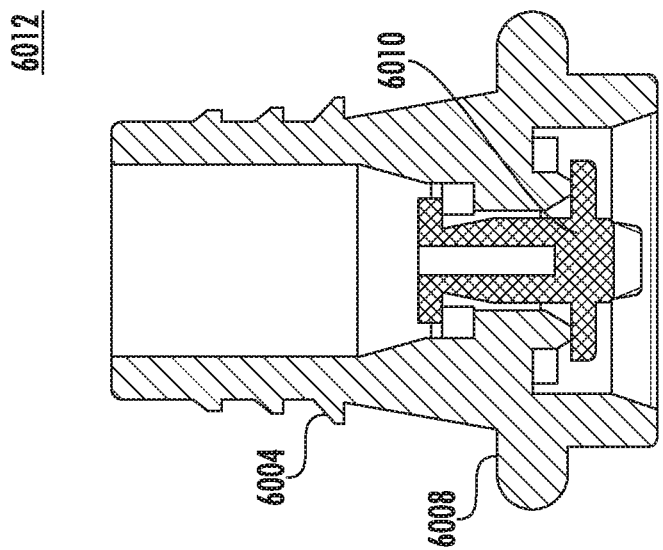
FIG. 61 depicts an exemplary cross-sectional view of the stopper of FIGS. 59 and 60, and illustrates how an upper and a lower portion of the plug hold the plug in place in the hole through the center of the stopper, where the cross-section is taken along a diameter illustrating a cross-section cutaway view of plug inserted within the opening of the stopper, and illustrating upper rim ring, as well as several exemplary rib(s), according to an exemplary embodiment.

FIG. 61 depicts an exemplary cross-sectional view 6012 of the stopper of FIGS. 60 and 61, and illustrates how an upper and a lower portion of the plug hold the plug 5712 in place in the hole through the center of the stopper 6002, where the cross-section is taken along a diameter illustrating a cross-section cutaway view of plug 6010 inserted within the opening of the stopper, and illustrates upper rim ring 6008, as well as several exemplary rib(s) 6004, according to an exemplary embodiment.

According to another exemplary embodiment, an improved autopump may be provided, which according to an exemplary embodiment is described with reference to FIGS. 62-68.

FIG. 62 illustrates an exemplary isometric view 6300 of an exemplary autopump, according to an exemplars' embodiment.

FIG. 63 depicts a partial cutaway view 6400 illustrating various exemplary internal portions of the vacuum pump, described further below with reference to cross-section view 6900 of FIG. 68, below.

FIG. 64 depicts an exemplary orthographic top view 6500 of the exemplary autopump including an exemplary adapter power plug port 6502, into which a power supply source plug may be inserted, i.e., into which a power transformer supply may be plugged, according to an exemplary embodiment. View 6500 also illustrates an exemplary output, in this case an exemplary LED light or lamp. According to an exemplary embodiment, the LED status may represent if the autopump is charging, charged, ready for use, in use, etc.

FIG. 65 depicts an exemplary orthographic bottom view 6600 of the exemplary autopump, according, to an exemplary embodiment.

Figure 66:
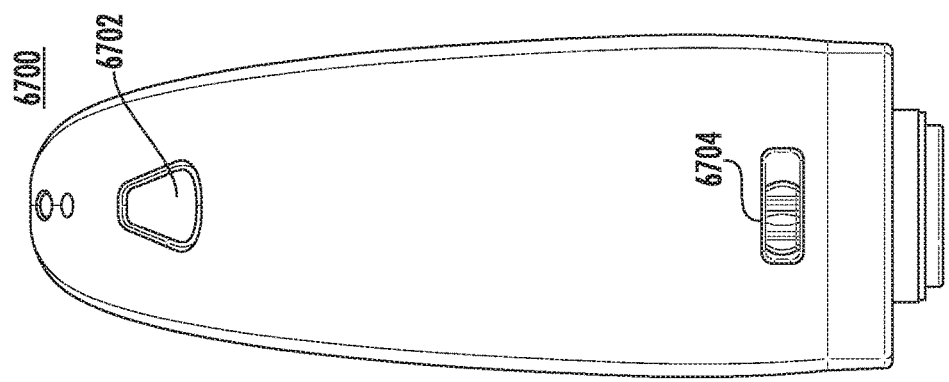
FIG. 66 depicts an exemplary orthographic front view of the autopump, according to an exemplary embodiment.

FIG. 66 depicts an exemplary orthographic front view 6700 of the autopump, according to an exemplary embodiment. The autopump includes, in an exemplary embodiment, on/off toggle key button 6702 for activating the vacuum pump when activated, an exemplary vacuum pressure setting sliding toggle button 6704, and sealer vacuum part 6706, which may include an exemplary rubber ring for sealing the pump to the container or bag, vacuum interface port(s), according to an exemplary embodiment. Also visible in FIGS. 62-65 the toggle sliding button 6704 allows for user selection of a high pressure or low pressure vacuum pump setting, according to an exemplary embodiment. In an exemplary embodiment, if air in a vacuum bag is being evacuated, then the button max be in an exemplary low pressure setting, and if air in a large container is being evacuated, then, according to an exemplary embodiment, the toggle switch may be set to the exemplary high vacuum power mode, for example, according to an exemplary embodiment.

Figure 67:
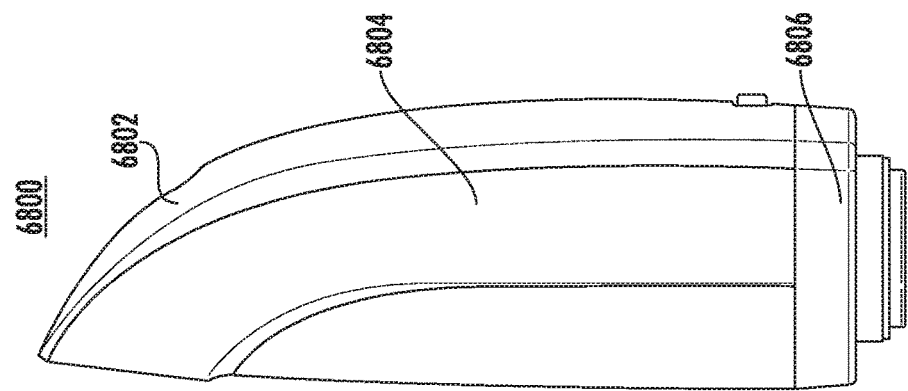
FIG. 67 depicts an orthographic left side view illustrating an exemplary front cover portion, an exemplary back cover portion, and an exemplary base portion, according to an exemplary embodiment.

FIG. 67 depicts orthographic left side view 6800 illustrates an exemplary front cover portion 6802, an exemplary back cover portion 6804, and an exemplary base portion 6806, according to an exemplary embodiment. The autopump is symmetrical so the right side view (not shown) is a mirror image of FIG. 67, according to an exemplary embodiment.

FIG. 68 depicts a cross-sectional view 6900 depicting an exemplary control printed circuit board (PCB) 6902, an exemplary rechargeable battery 6904, which may include, in an exemplary embodiment, a 1.2 v, 900 mA/unit, 5 piece battery, an exemplary vacuum pump 6906, an exemplary pressure switch 6908, which may include in an exemplary embodiment, an exemplary first pressure valve having a −30 Kpa. exemplary pressure, and an exemplary second pressure valve having an exemplary pressure of −40 Kpa, according to an exemplary embodiment.

According to an exemplary embodiment, when using a pump to evacuate liquids, to avoid having liquids enter an exemplary vacuum pump, an exemplary liquid catcher container adapter may be used as described further with reference to FIGS. 69, 70 and 71, below.

Figure 69:
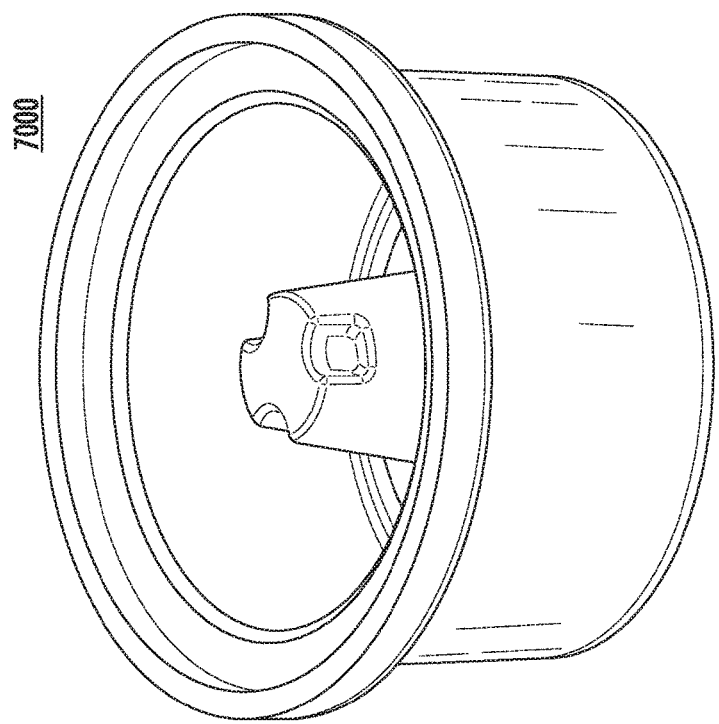
FIG. 69 depicts an exemplary isometric perspective view of an exemplary liquid collecting or capturing container or cap, which may be used between a container vacuum port and a pump to catch liquid that may come out of the container by the pressure caused by the vacuum, according to an exemplary embodiment.

FIG. 69 depicts an exemplary isometric perspective view 7000 of an exemplary liquid collecting or capturing container or cap, which may be used between a container vacuum port and a pump to catch liquid that may come out of the container by the pressure caused by the vacuum, according to an exemplary embodiment.

Figure 70:
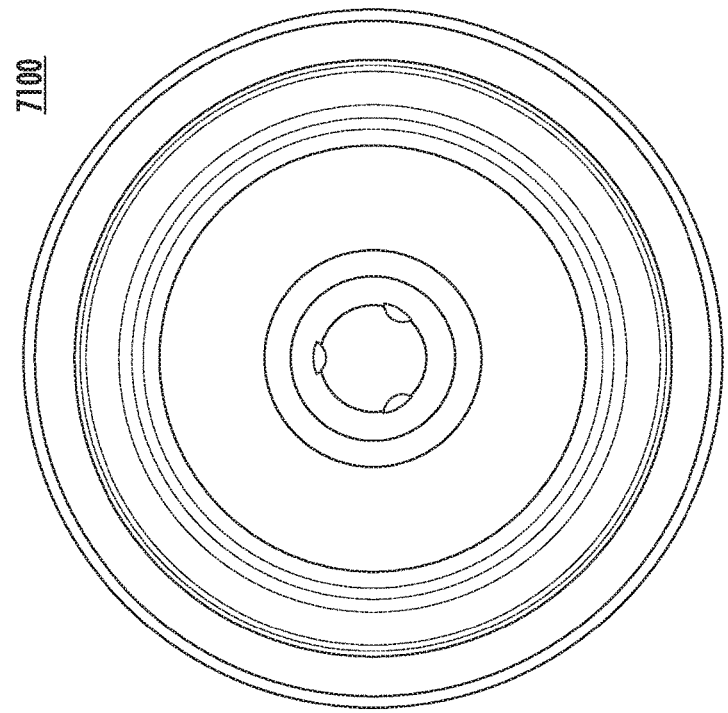
FIG. 70 depicts an exemplary orthographic top view of the exemplary liquid collecting or capturing container or cap, according to an exemplary embodiment.

FIG. 70 depicts an exemplary orthographic top view 7100 of the exemplary liquid collecting or capturing container or cap, according to an exemplary embodiment.

FIG. 71 depicts an exemplary cross-section view 7200 of the exemplary liquid collecting or capturing container or cap, according to an exemplary embodiment.

CONCLUSION

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A vacuum container comprising:
   a rounded rectangular or square base with an opening at the top to receive foodstuffs and adapted with an edge;
   an optional cover comprising at least two locking latches adapted to couple to said edge, said optional cover to close the opening of the vacuum container, said cover comprising:
   a circular vacuum tubular interface opening forming a cylindrical hole through said cover, and
   a cross-shaped notch on the inner cross-section of the tubular interface opening, through which at least a portion of a plug may be received and disposed when evacuating air from the container; and
   an electrically-powered air evacuation pump comprising at least one of:
   at least one power setting;
   a plurality of power settings to allow higher suction power at a higher of said plurality of said power settings, and to allow a lower suction power in a lower of said plurality of power settings;
   a vacuum container power setting and a vacuum bag power setting;
   a stand on which to store
   a cavity to receive at least one battery;
   a cavity to receive at least one rechargeable battery; and
   an interface adapted to be coupled to at least one power source by providing at least one of AC to DC, or converted power, or to recharge a rechargeable, energy source.

2. The vacuum container of claim 1, wherein said cover and said base are of different color transparent plastic,
   wherein said base comprises clear transparent plastic; and
   wherein said cover comprises teal colored transparent plastic.

3. The vacuum container of claim 1, wherein said optional cover has at least one of: two or four locking latches.

4. The vacuum container of claim 1, further comprising an optional salad spinner adapted to be placed on said base after removing said optional cover.

5. The vacuum container of claim 1, further comprising an optional salad chopper adapted to be placed on said base after removing said optional cover.

6. The vacuum container of claim 1, wherein said optional cover comprises a concave annular cavity for receiving an annular protrusion of a bottom of another container base, adapted to stack a respective pair of vacuum containers.

7. The vacuum container of claim 6, comprising at least one of:
   wherein said annular protrusion of said bottom of said container base is of sufficient depth to securely couple a stacked pair of said respective pair of vacuum containers when said respective pair of vacuum containers is in an evacuated vacuum state; or
   wherein said vacuum container comprises being further adapted to stack a plurality of said vacuum containers atop one another.

8. The vacuum container of claim 1, wherein said container comprises a vacuum indicator.

9. The vacuum container of claim 1, wherein said container comprises a removable divider comprising at least one of:
   a plurality of vertical dividers adapted to fit into at least one pair of slots in an inner surface of the vacuum container;
   a plurality of vertical dividers adapted to form a t-shape when a first vertical divider is slid into a slot on a second vertical divider;
   a plurality of vertical dividers, wherein each of said plurality of said vertical dividers comprises a t-shaped foot to stabilize said vertical divider from falling over;
   two vertical dividers which together form a t-shape, to form three distinct compartments in the vacuum container;

three vertical dividers which together form four distinct compartments in the vacuum container; or wherein the vertical divider may be slidably and removably inserted into at least one of at least one slot, or at least one groove in the inner wall of the container.

10. The vacuum container of claim 1, wherein said container an age of contents day indicator dial.

11. The vacuum container according to claim 1, further comprising a foodstuff receiving and spinning basket, received within said rounded rectangular container, and a removable container cover comprising a mechanism adapted to at least one of: spin, rotate, or dry, said foodstuff received in said foodstuff receiving and spinning basket.

12. The vacuum container according to claim 1, further comprising a foodstuff chopping or cutting cover adapted to cut or chop foodstuff into said vacuum container.

13. The vacuum container of claim 1, wherein said electrically powered air evacuation pump is adapted to be coupled to and used in combination with at least one fluid collecting container.

14. The vacuum container according to claim 13, wherein said at least one fluid collecting container comprises:
   at least one outer ring adapted to couple said pump to the vacuum container; and
   at least one inner raised portion comprising:
      at least one hole, and forming a channel between said at least one outer ring to capture fluid or liquid, wherein said at least one inner raised portion comprises at least one of:
         a cylindrical shaped raised portion, or
         a conical raised portion.

15. The vacuum container according to claim 14, wherein said at least one fluid or liquid collecting container comprising said at least one hole comprises at least three holes.

16. A vacuum container comprising:
   a rounded rectangular or square base with an opening at the top to receive foodstuffs and adapted with an edge;
   an optional cover comprising at least two locking latches adapted to couple to said edge, said optional cover to close the opening of the vacuum container, said cover comprising:
      a circular vacuum tubular interface opening forming a cylindrical hole through said cover, and
      a cross-shaped notch on the inner cross-section of the tubular interface opening, through which at least a portion of a plug may be received and disposed when evacuating air from the container; and
   a twist and lock cap adapted to at least one of:
      releasably lock or unlock a silicone plug on said cover of said container, so as to disallow, or allow air to vacuate or evacuate from the container; or
      couple said silicone plug to said container lid to avoid loss of said silicone plug.

17. The vacuum container according to claim 16, wherein said twist and lock cap comprises at least one of:
   at least one opening through which air may move when in an unlocked position, and when said silicone plug is permitted to release the vacuum;
   wherein said twist and lock cap comprises at least one external handle or protrusion for grasping said cap when twisting to lock or unlock; or
   wherein said cap comprises an inner protrusion for coupling with a portion of the cover of the container to lock the cap in place when twisted in a locked position.

18. The vacuum container according to claim 17, wherein said silicone plug is permitted to release the vacuum when a button portion is depressed through an opening in said cap, when said cap is in an unlocked position.

19. The vacuum container according to claim 17, wherein said cap comprises said inner protrusion, and wherein said inner protrusion may couple with a helical screw shaped protrusion on the container cover to lock said cap and said plug in place, when said cap is placed in a locked position.

* * * * *